United States Patent
Nickerson

(10) Patent No.: US 12,008,161 B2
(45) Date of Patent: Jun. 11, 2024

(54) SMART RING

(71) Applicant: ARKH, Inc., Dallas, TX (US)

(72) Inventor: Landon Nickerson, Dallas, TX (US)

(73) Assignee: ARKH, Inc., Dallas, TX (US)

( * ) Notice: Subject to any disclaimer, the term of this patent is extended or adjusted under 35 U.S.C. 154(b) by 374 days.

(21) Appl. No.: 16/944,506

(22) Filed: Jul. 31, 2020

(65) Prior Publication Data

US 2021/0089126 A1  Mar. 25, 2021

Related U.S. Application Data

(60) Provisional application No. 62/990,059, filed on Mar. 16, 2020, provisional application No. 62/905,239, filed on Sep. 24, 2019.

(51) Int. Cl.
*G06F 3/01*  (2006.01)
*G06F 3/042*  (2006.01)
(Continued)

(52) U.S. Cl.
CPC .............. *G06F 3/014* (2013.01); *G06F 3/016* (2013.01); *G06F 3/042* (2013.01); *G06F 3/044* (2013.01); *G06F 3/167* (2013.01); *G06V 40/1306* (2022.01); *G06V 40/1365* (2022.01); *G08B 6/00* (2013.01); *H04B 1/385* (2013.01);
(Continued)

(58) Field of Classification Search
CPC .......... G06F 3/014; G06F 3/016; G06F 3/042; G06F 3/044; G06F 3/167; G06F 3/017; G06F 3/0346; G06V 40/1306; G06V 40/1365; G06V 40/113; G06V 40/28;
(Continued)

(56) References Cited

U.S. PATENT DOCUMENTS

| 5,945,978 A | 8/1999 | Holmes |
| 7,215,321 B2 | 5/2007 | SanGiovanni |

(Continued)

FOREIGN PATENT DOCUMENTS

| WO | 2019229698 A1 | 12/2019 |
| WO | 2020170105 A1 | 8/2020 |

OTHER PUBLICATIONS

Nickerson, Landon; U.S. Appl. No. 17/203,654, filed Mar. 16, 2021; Title: Spatially Aware Computing Hub Environment; 79 pages.
(Continued)

*Primary Examiner* — Jonathan A Boyd
(74) *Attorney, Agent, or Firm* — Conley Rose, P.C.; Grant Rodolph; Robert E. Kent

(57) ABSTRACT

A smart ring is provided. The smart ring includes a ring body configured to be worn on a finger of a user. The smart ring includes a capacitive touch sensor coupled to the ring body. The capacitive touch sensor is configured to receive a touch input from the user and convert the touch input into an input signal. The smart ring includes a processor coupled to the capacitive touch sensor. The processor is configured to receive the input signal from the capacitive touch sensor and generate a transmission signal using the input signal. The smart ring further includes a communications interface coupled to the processor. The communications interface is configured to transmit the transmission signal to another device.

19 Claims, 14 Drawing Sheets

(51) Int. Cl.
| | |
|---|---|
| *G06F 3/044* | (2006.01) |
| *G06F 3/16* | (2006.01) |
| *G06V 40/12* | (2022.01) |
| *G06V 40/13* | (2022.01) |
| *G08B 6/00* | (2006.01) |
| *H04B 1/3827* | (2015.01) |
| *H04B 5/72* | (2024.01) |
| *H04R 1/08* | (2006.01) |

(52) U.S. Cl.
CPC ............ *H04B 5/72* (2024.01); *H04R 1/08* (2013.01); *H04B 2001/3861* (2013.01)

(58) Field of Classification Search
CPC ........ G08B 6/00; H04B 1/385; H04B 5/0031; H04B 2001/3861; H04R 1/08; H04R 1/028
See application file for complete search history.

(56) References Cited

U.S. PATENT DOCUMENTS

| | | |
|---|---|---|
| 7,512,185 B2 | 3/2009 | Sharon et al. |
| 7,706,404 B2 | 4/2010 | Fleming |
| 7,716,586 B2 | 5/2010 | Dieberger et al. |
| 7,756,002 B2 | 7/2010 | Batra et al. |
| 8,031,172 B2 | 10/2011 | Kruse et al. |
| 8,232,976 B2 | 7/2012 | Yun et al. |
| 8,378,795 B2 | 2/2013 | Steger et al. |
| 8,599,152 B1 | 12/2013 | Wurtenberger et al. |
| 8,698,764 B1 | 4/2014 | Karakotsios et al. |
| 8,799,803 B2 | 8/2014 | Amm |
| 8,809,716 B2 | 8/2014 | Gohng et al. |
| 8,830,163 B2 | 9/2014 | Sim et al. |
| 8,860,763 B2 | 10/2014 | Privault et al. |
| 9,030,424 B2 | 5/2015 | Shih et al. |
| 9,141,148 B2 | 9/2015 | Richter et al. |
| 9,141,272 B1 | 9/2015 | Cleron et al. |
| 9,229,540 B2 | 1/2016 | Mandella et al. |
| 9,268,483 B2 | 2/2016 | Dennis et al. |
| 9,330,545 B2 | 5/2016 | Kempin et al. |
| 9,335,790 B2 | 5/2016 | Stotler |
| 9,335,823 B2 | 5/2016 | Modarres et al. |
| 9,383,839 B1 | 7/2016 | Rost et al. |
| 9,412,002 B2 | 8/2016 | Magi |
| 9,446,665 B2 | 9/2016 | Abel et al. |
| 9,474,580 B2 | 10/2016 | Hannaford et al. |
| 9,535,550 B2 | 1/2017 | Levesque et al. |
| 9,535,557 B2 | 1/2017 | Bernstein et al. |
| 9,547,366 B2 | 1/2017 | Ullrich et al. |
| 9,600,076 B2 | 3/2017 | Levesque et al. |
| 9,600,083 B2 | 3/2017 | Levesque et al. |
| 9,606,624 B2 | 3/2017 | Cruz-Hernandez et al. |
| 9,645,647 B2 | 5/2017 | Levesque |
| 9,690,377 B2 | 6/2017 | Lee et al. |
| 9,690,381 B2 | 6/2017 | Levesque et al. |
| 9,690,382 B1 | 6/2017 | Moussette et al. |
| 9,696,822 B2 | 7/2017 | Dow et al. |
| 9,713,500 B2 | 7/2017 | Kim et al. |
| 9,746,921 B2 | 8/2017 | Mallinson |
| 9,746,933 B2 | 8/2017 | Burba et al. |
| 9,778,813 B2 | 10/2017 | Shenfield et al. |
| 9,785,123 B2 | 10/2017 | Mansour et al. |
| 9,792,272 B2 | 10/2017 | Hicks |
| 9,798,388 B1 | 10/2017 | Murali |
| 9,813,841 B2 | 11/2017 | Yin et al. |
| 9,830,782 B2 | 11/2017 | Morrell et al. |
| 9,880,697 B2 | 1/2018 | Anderson et al. |
| 9,891,709 B2 | 2/2018 | Heubel |
| 9,904,409 B2 | 2/2018 | Lee et al. |
| 9,927,902 B2 | 3/2018 | Burr et al. |
| 9,939,963 B2 | 4/2018 | Beckman |
| 9,945,818 B2 | 4/2018 | Ganti et al. |
| 9,946,505 B2 | 4/2018 | Becze et al. |
| 9,965,033 B2 | 5/2018 | Park et al. |
| 10,007,772 B2 | 6/2018 | Slaby et al. |
| 10,061,458 B1 | 8/2018 | Bristol et al. |
| 10,065,114 B2 | 9/2018 | Goetgeluk et al. |
| 10,075,814 B2 | 9/2018 | Sydir et al. |
| 10,088,902 B2 | 10/2018 | Keller et al. |
| 10,126,779 B2 | 11/2018 | von Badinski et al. |
| 10,126,941 B2 | 11/2018 | Zhu et al. |
| 10,146,308 B2 | 12/2018 | Cruz-Hernandez et al. |
| 10,171,129 B1 | 1/2019 | Hammerschmidt et al. |
| 10,183,217 B2 | 1/2019 | Chen et al. |
| 10,185,670 B2 | 1/2019 | Litichever et al. |
| 10,216,272 B2 | 2/2019 | Keller et al. |
| 10,285,013 B2 | 5/2019 | Ledvina et al. |
| 10,331,777 B2 | 6/2019 | Hicks et al. |
| 10,346,038 B2 | 7/2019 | England et al. |
| 10,372,221 B2 | 8/2019 | Robert et al. |
| 10,372,270 B2 | 8/2019 | Hoggarth et al. |
| 10,386,960 B1 | 8/2019 | Smith |
| 10,416,774 B2 | 9/2019 | Weddle et al. |
| 10,437,337 B2 | 10/2019 | Park |
| 10,444,834 B2 | 10/2019 | Vescovi et al. |
| 10,490,035 B2 | 11/2019 | Morrell et al. |
| 10,496,193 B1 | 12/2019 | Alfano et al. |
| 10,496,235 B2 | 12/2019 | Woley et al. |
| 10,503,454 B2 | 12/2019 | Sirpal et al. |
| 10,509,469 B2 | 12/2019 | Erivantcev et al. |
| 10,514,780 B2 | 12/2019 | Su et al. |
| 10,514,831 B2 | 12/2019 | Sirpal et al. |
| 10,514,877 B2 | 12/2019 | Becze |
| 10,528,230 B2 | 1/2020 | Sirpal et al. |
| 10,528,312 B2 | 1/2020 | Reeves |
| 10,534,447 B2 | 1/2020 | Li |
| 10,540,052 B2 | 1/2020 | Gimpl et al. |
| 10,540,087 B2 | 1/2020 | Sirpal et al. |
| 10,545,580 B2 | 1/2020 | Yang et al. |
| 10,545,712 B2 | 1/2020 | Reeves et al. |
| 10,547,716 B2 | 1/2020 | Jeon et al. |
| D875,097 S | 2/2020 | Martin et al. |
| 10,552,007 B2 | 2/2020 | Sirpal et al. |
| 10,558,321 B2 | 2/2020 | Sirpal et al. |
| 10,558,414 B2 | 2/2020 | Reeves et al. |
| 10,558,415 B2 | 2/2020 | de Paz |
| 10,572,095 B2 | 2/2020 | Sirpal et al. |
| 10,579,099 B2 | 3/2020 | Wang et al. |
| 10,592,061 B2 | 3/2020 | Sirpal et al. |
| 10,599,218 B2 | 3/2020 | Saboune et al. |
| 10,602,556 B2 | 3/2020 | Foster et al. |
| 10,606,359 B2 | 3/2020 | Levesque et al. |
| D880,487 S | 4/2020 | Martin et al. |
| 10,627,902 B2 | 4/2020 | Vescovi et al. |
| 10,652,383 B2 | 5/2020 | Selim |
| 10,664,121 B2 | 5/2020 | Sirpal et al. |
| 10,664,129 B2 | 5/2020 | Lee et al. |
| 10,678,411 B2 | 6/2020 | Reeves et al. |
| 10,684,478 B2 | 6/2020 | Osterhout |
| 10,698,486 B2 | 6/2020 | Reynolds et al. |
| 10,705,674 B2 | 7/2020 | Gimpl et al. |
| 10,706,251 B2 | 7/2020 | Shim et al. |
| 10,713,907 B2 | 7/2020 | Anderson et al. |
| 10,716,371 B2 | 7/2020 | Ward |
| 10,719,191 B2 | 7/2020 | Sirpal et al. |
| 10,719,232 B2 | 7/2020 | Tse |
| 10,739,142 B2 | 8/2020 | Meier et al. |
| 10,740,058 B2 | 8/2020 | Sirpal et al. |
| 10,768,747 B2 | 9/2020 | Wang et al. |
| 10,775,891 B2 | 9/2020 | Sinclair et al. |
| 10,795,448 B2 | 10/2020 | Miller |
| 10,803,281 B2 | 10/2020 | Han et al. |
| 10,831,358 B2 | 11/2020 | Webber |
| 10,845,938 B2 | 11/2020 | Sirpal et al. |
| 10,849,519 B2 | 12/2020 | Mendenhall et al. |
| 10,852,154 B1 | 12/2020 | Knas et al. |
| 10,852,700 B2 | 12/2020 | Abramov |
| 10,853,013 B2 | 12/2020 | Sirpal et al. |
| 10,853,016 B2 | 12/2020 | Sirpal et al. |
| 10,871,871 B2 | 12/2020 | Cassar et al. |
| 10,893,833 B2 | 1/2021 | Harverinen et al. |
| 10,915,214 B2 | 2/2021 | Sirpal et al. |
| 10,922,870 B2 | 2/2021 | Vaganov |

(56) References Cited

U.S. PATENT DOCUMENTS

| | | | |
|---|---|---|---|
| 10,942,615 | B2 | 3/2021 | Helmes et al. |
| 10,949,051 | B2 | 3/2021 | Sirpal et al. |
| 10,955,974 | B2 | 3/2021 | Griffin |
| 10,963,007 | B2 | 3/2021 | de Paz et al. |
| 10,964,178 | B2 | 3/2021 | Aleksov et al. |
| 10,976,820 | B2 | 4/2021 | Ganadas et al. |
| 10,976,822 | B2 | 4/2021 | Dogiamis et al. |
| 10,983,559 | B2 | 4/2021 | Reeves et al. |
| 10,990,242 | B2 | 4/2021 | Sirpal et al. |
| 11,010,047 | B2 | 5/2021 | Sirpal et al. |
| 11,061,476 | B2 | 7/2021 | Remaley et al. |
| 11,073,826 | B2 | 7/2021 | Cella et al. |
| 11,093,200 | B2 | 8/2021 | Reeves et al. |
| 11,093,769 | B2 | 8/2021 | Dow et al. |
| 11,106,355 | B2 | 8/2021 | Kolondra et al. |
| 11,119,633 | B2 | 9/2021 | Yamamoto |
| 11,132,161 | B2 | 9/2021 | de Paz |
| 11,137,796 | B2 | 10/2021 | Sirpal et al. |
| 11,151,234 | B2 | 10/2021 | Kontsevich et al. |
| 11,182,046 | B2 | 11/2021 | Sirpal et al. |
| 11,221,646 | B2 | 1/2022 | Sirpal et al. |
| 11,221,647 | B2 | 1/2022 | Sirpal et al. |
| 11,221,649 | B2 | 1/2022 | Sirpal et al. |
| 11,226,710 | B2 | 1/2022 | Sirpal et al. |
| 11,231,786 | B1 | 1/2022 | Elangovan |
| 11,243,521 | B2 | 2/2022 | Cella et al. |
| 11,262,792 | B2 | 3/2022 | de Paz et al. |
| 2014/0143737 | A1* | 5/2014 | Mistry .................... G06F 1/163 |
| | | | 715/854 |
| 2015/0241985 | A1 | 8/2015 | Elangovan et al. |
| 2015/0277559 | A1* | 10/2015 | Vescovi ............... G06F 3/0416 |
| | | | 345/173 |
| 2015/0338916 | A1 | 11/2015 | Priyantha et al. |
| 2016/0054800 | A1 | 2/2016 | Kim et al. |
| 2016/0077587 | A1 | 3/2016 | Kienzle et al. |
| 2016/0292563 | A1 | 10/2016 | Park |
| 2016/0357258 | A1 | 12/2016 | Yeom et al. |
| 2017/0200353 | A1* | 7/2017 | Brown ..................... G08B 6/00 |
| 2018/0066945 | A1 | 3/2018 | Meier et al. |
| 2018/0136729 | A1 | 5/2018 | Kim et al. |
| 2018/0217667 | A1 | 8/2018 | Park |
| 2018/0349699 | A1 | 12/2018 | O'Connell et al. |
| 2019/0007093 | A1 | 1/2019 | Hammerschmidt et al. |
| 2019/0039570 | A1 | 2/2019 | Foster et al. |
| 2019/0135229 | A1 | 5/2019 | Ledvina et al. |
| 2019/0155385 | A1 | 5/2019 | Lim et al. |
| 2019/0199398 | A1 | 6/2019 | Hammerschmidt et al. |
| 2019/0272427 | A1 | 9/2019 | Yin et al. |
| 2019/0273636 | A1 | 9/2019 | Batra et al. |
| 2019/0317177 | A1 | 10/2019 | Ertan et al. |
| 2019/0332140 | A1 | 10/2019 | Wang et al. |
| 2020/0014526 | A1 | 1/2020 | Hammerschmidt et al. |
| 2020/0053689 | A1 | 2/2020 | McQueen et al. |
| 2020/0106877 | A1 | 4/2020 | Ledvina et al. |
| 2020/0241641 | A1 | 7/2020 | Vescovi et al. |
| 2020/0272221 | A1 | 8/2020 | Foster et al. |
| 2020/0275369 | A1 | 8/2020 | Foster et al. |
| 2020/0280952 | A1 | 9/2020 | Sasoglu et al. |
| 2020/0387222 | A1 | 12/2020 | Adesanya |
| 2021/0064132 | A1 | 3/2021 | Rubin et al. |

OTHER PUBLICATIONS

Han, Teng, et al.; "Frictio: Passive Kinesthetic Force Feedback for Smart Ring Output"; UIST; Oct. 22-25, 2017; Quebec City, Canada; 12 pages.

PCT International Search Report and PCT Written Opinion of the International Searching Authority; PCT/2020/044435; dated Nov. 24, 2020; 16 pages.

Amazon; "Introducing Echo Loop—Keep Alexa on Hand"; https://web.archive.org/web/20200310162907/https://www.amazon.com/EchoI-Loop/dp/B07K57PBKT; Mar. 10, 2020; 6 pages.

Kickstarter; "Circular Smart Ring—Sleep, Energy, Performance. Evolved."; http://web.archive.org/web/20200202025937/https://www.kickstarter.com/projects/circular-ring/cirulartm-smart-ring-sleep-energy-performance-evolved; Feb. 2, 2020; 3 pages.

JAKCOM; "JAKCOM R3 Instruction"; https://web.archive.org/web/20190903144307/http://www.jakcom.com/ins/R3/JAKCOM_R3.html; Sep. 3, 2019; 4 pages.

McLEAR; "McLEAR Ring"; https://web.archive.org/web/20190820205244/https://mclear.com/product/payment-ring/; Aug. 20, 2019; 7 pages.

NFC; "NFC Ring—Safe, Simple, Secure. One Smart Ring, Unlimited Possibilities"; https://web.archive.org/web/20190806195338/https://nfcring.com/; Aug. 6, 2019; 3 pages.

Orii; "Product Details"; https://web.archive.org/web/20190728004048/https://orii.io/products/orii; Jul. 28, 2019; 6 pages.

Oura; "Understand Your Body with Oura Ring & Improve Your Health"; https://web.archive.org/web/20191019192847/https://ouraring.com/why-oura/; Oct. 19, 2019; 6 pages.

SleepOn; "Go2Sleep (HST)"; https://www.sleepon.us/go2sleep/; Nov. 27, 2019; 10 pages.

Purcher, Jack; "Apple Won 59 Patents Today Covering Augmented Reality 3D Reconstruction and More"; Patently Apple; Oct. 15, 2019; 6 pages.

Roemmele, Brian; "What is the New Apple U1 Chip, and Why is it Important?"; Quora; Sep. 13, 2019; 17 pages.

TechCrunch; "Lego Sets Its Eye on the Future with Apple ARKit 2"; YouTube; Jun. 4, 2018; 1 page.

Office Action dated Mar. 18, 2022; U.S. Appl. No. 17/203,654, filed Mar. 16, 2021; 6 pages.

Office Action dated Jun. 20, 2022; U.S. Appl. No. 17/203,654, filed Mar. 16, 2021; 41 pages.

Nickerson, Landon; U.S. Appl. No. 18/464,933, filed Sep. 11, 2023; Title: Spatially Aware Computing Hub Environment; 77 pages.

Nickerson, Landon; U.S. Appl. No. 18/347,384, filed Jul. 5, 2023; Title: Smart Ring; 69 pages.

Notice of Allowance dated Apr. 28, 2023; U.S. Appl. No. 17/203,654, filed Mar. 16, 2021; 13 pages.

Partial Supplementary European Search Report; Application No. 20867226.1; dated Aug. 30, 2023; 12 pages.

Extended European Search Report; Application No. 20867226.1; dated Nov. 30, 2023; 11 pages.

Nickerson, Landon; U.S. Appl. No. 18/168,979, filed Feb. 14, 2023; Title: Spatially Aware Computing Hub Environment; 75 pages.

Final Office Action dated Nov. 18, 2022; U.S. Appl. No. 17/203,654, filed Mar. 16, 2021; 19 pages.

Advisory Action dated Feb. 8, 2023; U.S. Appl. No. 17/203,654, filed Mar. 16, 2021; 10 pages.

* cited by examiner

SMART RING

CROSS-REFERENCE TO RELATED APPLICATIONS

This application claims priority to U.S. Provisional Patent Application No. 62/905,239, filed on Sep. 24, 2019, and U.S. Provisional Patent Application No. 62/990,059, filed on Mar. 16, 2020, both of which are incorporated by reference herein in their entirety.

BACKGROUND

The present disclosure relates generally to a system and method for sensory augmentation via a smart ring.

Frequently, humans desire to communicate with others at a distance or with machines. However, typical sensory data provided to a human by a machine-human interface occupies one of the five senses, especially hearing or sight, rendering that sense distracted from other inputs. Moreover, individuals with disabilities such as hearing loss or vision impairment have difficulty interacting with such machine-human interfaces. Existing machine-human interfaces are often unsuitable for high-distraction environments, environments necessitating silences, or environments where a user must actively monitor real-world surroundings rather than an electronic device.

Additionally, existing smart accessory devices, such as watches or wrist-worn devices, are unsuitable for detecting hand movements of a user because they are unable to detect finger movement. Additionally, other approaches using watches or wrist-worn devices are unsuitable for communicating information using haptic stimulation for anatomical reasons related to lack of nerves or particular nerves sufficiently close to the skin in the wrist area.

SUMMARY

A smart ring is provided. The smart ring includes a ring body configured to be worn on a finger of a user. The smart ring includes a capacitive touch sensor coupled to the ring body. The capacitive touch sensor is configured to receive a touch input from the user and convert the touch input into an input signal. The smart ring includes a processor coupled to the capacitive touch sensor. The processor is configured to receive the input signal from the capacitive touch sensor and generate a transmission signal using the input signal. The smart ring further includes a communications interface coupled to the processor. The communications interface is configured to transmit the transmission signal to another device.

In some aspects of the smart ring, the touch input is a deep tap, and the processor is further configured to differentiate the deep tap from a single tap and a double tap.

In some aspects of the smart ring, the capacitive touch sensor is further configured to identify a fingerprint of the user and transmit user fingerprint data to the processor. In some of these aspects, the user fingerprint data is used to unlock the ring.

In some aspects of the smart ring, the smart ring further includes a position sensor coupled to the ring body. The position sensor is configured to obtain position data and send the position data to the processor. The processor is configured to generate a second transmission signal using the position data, and the communications interface is configured to transmit the second transmission signal to the other device.

In some aspects of the smart ring, the position data comprises position changes in three dimension of a Cartesian coordinate system.

In some aspects of the smart ring, the ring further includes a biometric sensor coupled to the ring body. The biometric sensor is configured to obtain biometric data on the user and send the biometric data to the processor. The processor is configured to generate a second transmission signal using the biometric data, and the communications interface is configured to transmit the second transmission signal to the other device.

In some aspects of the smart ring, the smart ring additionally includes a microphone coupled to the ring body. The microphone is configured to receive voice data from the user and send the voice data to the processor. The processor is configured to generate a second transmission signal using the voice data. The communications interface is configured to transmit the second transmission signal to the other device.

In some aspects of the smart ring, the smart ring further includes a memory coupled to the processor. The memory includes an access identifier (ID), and the communications interface includes a near field communications (NFC) interface that is configured to communicate the access ID to a security reader external to the smart ring.

In some aspects of the smart ring, the smart ring further includes a haptic stimulator coupled to the processor. The communications interface is configured to receive data, and the processor is configured to provide a drive signal to the haptic stimulator based on the data. The haptic stimulator is configured to receive the drive signal and communicate the data to the user via a haptic stimulation.

In some aspects of the smart ring, the haptic stimulation is a vibration.

In some aspects of the smart ring, the smart ring further includes an optical sensor coupled to the processor and oriented outward from the smart ring such that the optical sensor is oriented towards an end of the finger when the smart ring is worn by the user. The optical sensor is configured to detect an item to which the user is pointing, and the processor is further configured to send an indication of the item to the other device.

Another smart ring is provided. The smart ring includes a ring body configured to be worn on a finger of a user. The smart ring further includes a haptic stimulator coupled to the ring body, and the haptic stimulator is configured to create pressure on or transfer an electrical impulse to a skin of the user. The smart ring further includes a communications interface coupled to the ring body and configured to receive data. The smart ring further includes a processor coupled to the haptic stimulator and the communications interface. The processor is configured to provide a drive signal to the haptic stimulator based on the data, and the haptic stimulator is configured to receive the drive signal from the processor and communicate the data to the user via a haptic stimulation.

In some aspects of the smart ring, the communications interface receives the data wirelessly from a wireless device or a hub.

In some aspects of the smart ring, a plurality of the haptic stimulators are spaced around an interior surface of the ring body. The drive signal is configured to individually actuate each of the haptic stimulators in a series of unique combinations, and each unique combination represents a letter in an alphabet.

In some aspects of the smart ring, the smart ring further includes a touch sensor that is coupled to the ring body and that is configured to receive input from the user. The communications interface is further configured to transmit the input wirelessly to a wireless device or a hub.

In some aspects of the smart ring, the smart ring further includes an optical sensor coupled to the processor and oriented outward from the smart ring such that the optical sensor is oriented towards an end of the finger when the smart ring is worn by the user. The optical sensor is configured to detect an item to which the user is pointing, and the processor is further configured to send an indication of the item to the other device.

A method is provided. The method includes obtaining, using a smart ring worn on a finger of a user, position data of the smart ring. The position data comprises a position of the smart ring and any changes in the position of the smart ring. The method further includes sending the position data to another device.

In some aspects of the method, the position data identifies a movement by a hand of the user, and the position data sent to the other device directs an action on the other device.

In some aspects of the method, the movement is pointing, and the smart ring includes an optical sensor oriented outward from the smart ring towards an end of the finger. The optical sensor is configured to detect an item to which the user is pointing, and the method further includes sending an indication of the item to the other device.

In some aspects of the method, the movement is swiping, and the smart ring includes an optical sensor oriented outward from the smart ring towards an end of the finger. The optical sensor is configured to detect an item to which the user is swiping, and the method further includes sending an indication of the item to the other device.

BRIEF DESCRIPTION OF THE DRAWINGS

For a more complete understanding of various embodiments of the present disclosure and the advantages thereof, reference is now made to the following brief description, taken in connection with the accompanying drawings and detailed description, wherein like reference numerals represent like parts, and in which.

DETAILED DESCRIPTION

Figure 1:
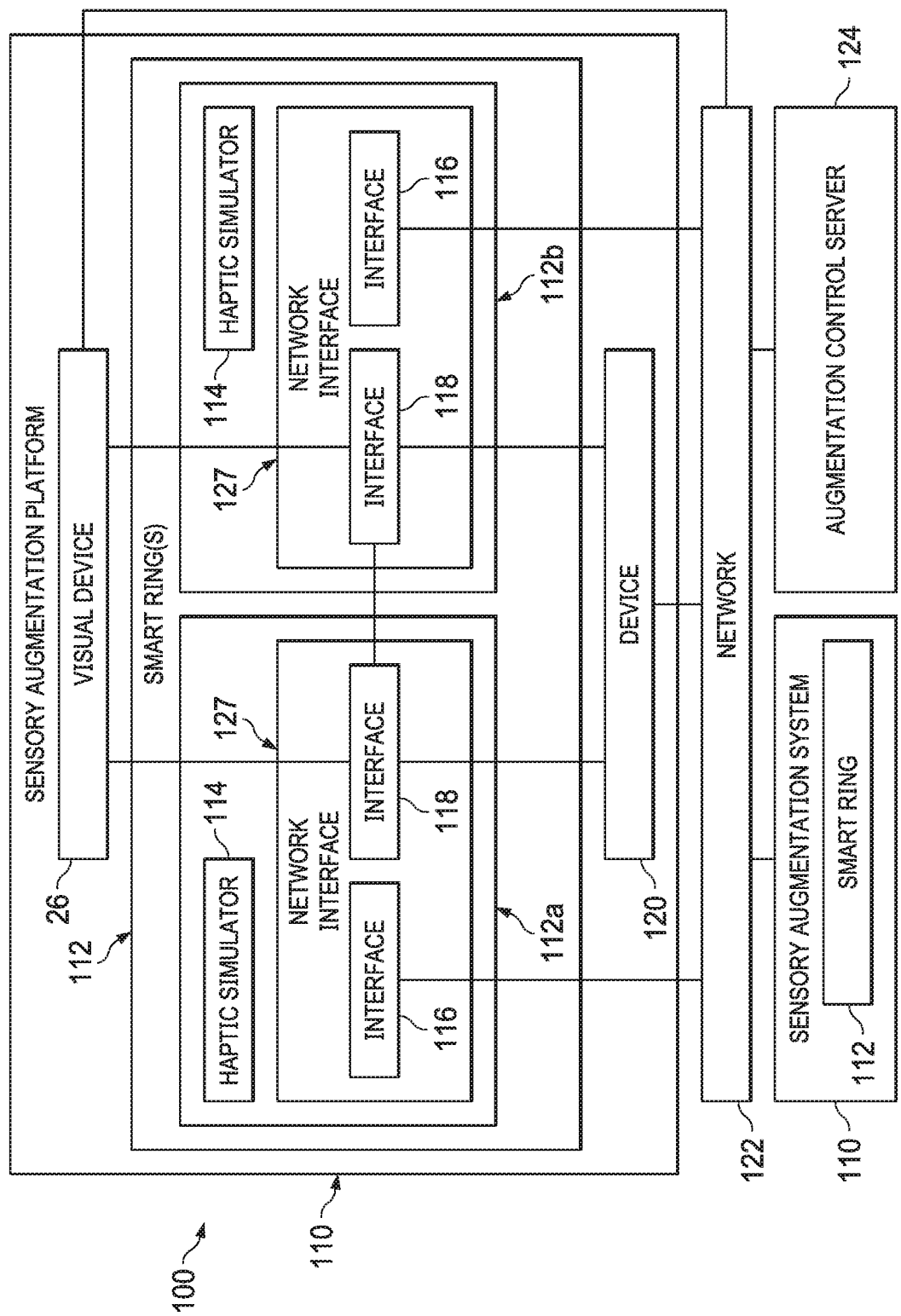
FIG. 1 illustrates an example of a sensory augmentation platform to communicate using haptic stimulation, in accordance with various embodiments.

The present disclosure is generally described in detail with reference to embodiments illustrated in the drawings. However, other embodiments may be used and/or other changes may be made without departing from the spirit or scope of the present disclosure. The illustrative embodiments described in the detailed description are not meant to be limiting of the subject matter presented herein.

Reference will now be made to the exemplary embodiments illustrated in the drawings, and specific language will be used to describe the same. It will nevertheless be understood that no limitation of the scope of the invention is thereby intended. Alterations and further modifications of the features illustrated and/or described herein, and additional applications of the principles of the embodiments as illustrated herein, which would occur to one skilled in the relevant in view of this disclosure, are to be considered within the scope of the invention.

Some embodiments include a sensory augmentation device or system configured to communicate information to a user using tactile sensations, such as haptic sensations, electrical stimulation, and/or pressure sensations. A user may learn to associate meaning with haptic sensations, thereby facilitating communication between a device and a user. Some embodiments of systems, devices, and/or methods disclosed herein may provide a sequence of such sensations in parallel and/or in series over time. Moreover, a user may be readily trained to recognize the sequence of such sensations as corresponding to meanings. In various embodiments, a wearable headpiece, such as a pair of glasses with a built-in visual image projector may be worn and visual images may be projected that correspond to different haptic stimuli. The user may thus be trained to understand the meaning of the different haptic stimuli by being shown relevant visual images. A user may also enjoy training through use of a smartphone application, or a computer program, or an online training portal. For example, a computer application or other program may be loaded on a computer and screen displays may correspond to different haptic stimuli. Furthermore, augmented reality, virtual reality, and other such immersive environments may be created by the combination of a visual stimuli and haptic stimuli. Still furthermore, bone conduction headphones or other aural stimulus devices may be incorporated into the pair of glasses to further provide auditory stimuli in connection with the haptic stimuli. In this manner, stimulation of vision, sound, and haptic senses may be combined to communicate information or simulate seen, heard, and felt experiences.

Many example use cases are contemplated. In one example embodiment, an application is installed on a handheld computing device such as a smartphone. The application may connect the smartphone to the sensory augmentation device providing the haptic stimulation. For instance, text messages, alarms, and other alerts that would generate a visual or audible alert at the handheld computing device may generate a haptic alert via the systems, devices, and methods disclosed herein. An application may also be run on a desktop or laptop computing device. The application may connect the computer to the sensory augmentation device providing the haptic stimulation. For instance, training scenarios, games, and other visual displays on the computer may correspond to haptic alerts. In this manner, a user may be trained to understand the meaning of different alerts in an immersive electronic training environment, through scenario based training episodes, and the like.

Moreover, multiple sensory augmentation devices may provide haptic information to multiple body areas. For instance, multiple finger rings, toe rings, bracelets, and/or other devices may be used. The different devices may play different communicative roles. For example, a ring may be placed on each of a first finger and a second finger. Upon receipt of a message, both rings may stimulate a corresponding finger to indicate the presence of an alert, subsequently one ring may provide haptic stimulation to communicate the nature or origin of the alert, and another ring may provide haptic stimulation to communicate content of the alert.

Systems, devices, and methods to communicate via such haptic stimuli may also include aspects to receive user input. For instance, a ring that provides haptic stimulation may also include a touch sensor that receives inputs. For instance, human input to the sensory augmentation devices, systems, and/or methods may include swipes, taps, multi-taps, deep taps, voice dictation, motion or gesture tracking (e.g., via gyroscopic, piezoelectric, optical, or other sensors).

Users thus may readily translate conversations with foreign language speakers, receive and understand navigation instructions from a mapping device without looking at the device or otherwise becoming visually distracted, may control devices, may learn languages, may control game systems, may engage in virtual reality environments, and may conduct financial transactions, among other uses, without need for engaging vision or hearing senses.

With reference now to FIG. 1, an example of a sensory augmentation platform 100 that includes one or more smart rings 112 of a first user and one or more smart rings 112 of another user or users is disclosed. The sensory augmentation platform 100 may include a sensory augmentation system 110 of a user, an augmentation control server 124 (e.g., a spatially localized computing device also referred to herein as a hub or smart hub), and one or more sensory augmentation systems 110 of other users. Each of the sensory augmentation systems 110 may include the one or more smart rings 112, a computing device 120 (e.g., a smartphone), and/or a visual device 26. In some examples, the sensory augmentation platform 100 is configured to communicate human readable data to a user via haptic stimulation using the one or more smart rings 112. In various instances, the sensory augmentation platform 100 is also configured to receive inputs from a user via various devices or sensors discussed more fully herein.

In some examples, the one or more smart rings 112 are wearable apparatus configured to deliver haptic stimulation to a user's finger or fingers in order to communicate human-readable messages or other information through the haptic stimulation.

Each of the one or more smart rings 112 may include haptic stimulators 114 (e.g., vibrators, electrodes, and/or piezoelectric stimulators) configured to provide haptic stimulation to a user or users of the one or more smart rings 112 based on data corresponding to information to be communicated to the user as described in more detail below with reference to FIGS. 2A and 2B. Briefly, the one or more smart rings 112 cause the haptic stimulators 114 to provide haptic stimulation such that a user of the smart ring 112 feels the haptic stimulation at different locations or positions on the body (e.g., multiple locations of a finger), the locations corresponding to different information. For instance, haptic stimulation may be felt at different positions around a finger proximate to an interior annulus of a ring including the haptic stimulators 114. By registering the different clock positions of the haptic stimulation, a user may register different messages.

Similarly, a user may feel different sensations arising from the haptic stimulation, the different character of the sensations corresponding to different information. For example, the haptic stimulation may provide different sensations of hardness, softness, pressure, vibration, and/or any other mechanical or non-mechanical sensory (e.g. electrical) input, as well as different combinations thereof. The different sensations may correspond to different information communicated to the user and may be combined with stimulation perceived to be at different locations, thereby communicating yet further varieties of information.

The one or more smart rings 112 may additionally include one or more network interfaces 127 to facilitate communication between the one or more smart rings 112 and other devices (such as the computing device 120 and the augmentation control server 124). The network interfaces 127 may include a network interface 116 and/or a body area network interface 118.

The network interfaces 116 may comprise an electronic modem (e.g. a radio frequency (RF) transceiver) or other communication device. For example, the network interfaces 116 may be or may include a first transceiver configured to connect the one or more smart rings 112 to a network 122 (e.g., the Internet), may include a second transceiver configured to connect another smart ring 112 to other components of the sensory augmentation platform 100, or may be or may include both the first transceiver and the second transceiver. In some examples, the network interfaces 116 may comprise a Bluetooth, Wi-Fi, WiMAX, 802.11x, ZigBee, cellular, or any other interface operative to communicatively couple the one or more smart rings 112 to the network 122, and/or operative to communicatively couple the one or more smart rings 112 to one or more other components or devices in the sensory augmentation platform 100.

The body area network interfaces 118 may provide Bluetooth or other connection that communicatively couples one or more aspects (e.g., components) of a smart ring 112 to one or more other aspects (e.g., components) of the smart ring 112, communicatively couples each of the one or more smart rings 112 to one or more other smart rings 112, and/or communicatively couples each of the one or more smart rings 112 to another device. The body area network interfaces 118 may provide a Bluetooth, Wi-Fi, WiMAX, 802.11x, ZigBee, cellular or other electrical, optical, sonic, or other operative connection between aspects of each of the one or more smart rings 112 and another smart ring (or another device). The body area network interfaces 118 may receive input from other aspects of the one or more smart rings 112 and may provide output to other aspects of the one or more smart rings 112. One such aspect may include the network interface 116. In some examples, the body area network interface 118 is omitted and the network interface 116 also performs the function of the body area network interface 118.

During operation, the smart ring 112 may be in electronic communication with the network 122. The smart ring 112 may also communicate with other smart rings 112 via the network 122. For example, multiple individuals may wear smart rings 112, which may be connected to the network 122. The individuals may send and receive messages to/from the smart ring 112 of each other. Furthermore, a user may wear multiple smart rings 112, such as the smart ring 112a and 112b. While in some embodiments, multiple smart rings 112 of a user may intercommunicate via a local network or virtual local area networks, such as via local Bluetooth connections to a user's smartphone, in further instances, multiple smart rings 112 of a user may both connect to the network 122 and may intercommunicate via the network 122. Thus, the one or more smart rings 112 shown in FIG. 1 may be associated with different individuals and/or multiple smart rings 112 shown in FIG. 1 may be utilized by a same individual while the smart rings 112 are communicatively coupled to each other.

In various embodiments, during operation, the one or more smart rings 112 may be in electronic communication, via the network 122, with an augmentation control server 124. In various instances, the augmentation control server 124 provides data to one or more of the smart rings 112 corresponding to a message to communicate to a user via haptic stimulation. For example, the augmentation control server 124 may provide data 41a or 41b described below with reference to FIGS. 2A and 2B to one or more of the smart rings 112. Moreover, in various instances, the augmentation control server 124 receives data, such as the transmission signals 44a or 44b of FIG. 2, regarding a user, such as via data input aspects of the one or more smart rings 112, for processing in connection with messages, and/or for communication to another user of a further smart ring 112.

Each of the one or more smart rings 112 may be configured to communicate with the augmentation control server 124, and the augmentation control server 124 may be configured to permit or reject forwarding of a message to a different smart ring 112. In this manner, each of the one or more smart rings 112 may transmit information, receive information, and interact with other smart rings of the one or more smart rings 112, as desired. In various embodiments, a user may wear two of the one or more smart rings 112, or may wear a smart ring 112 with multiple worn components to stimulate multiple parts of a user's body. For instance, the one or more smart rings 112 may include a ring worn on each hand. The augmentation control server 124 may coordinate the provision of messages to the multiple smart rings 112 to be delivered in a time-coordinated manner to a user. In further instances, a local device of the user coordinates the provision of messages to the multiple smart rings 112 to be delivered in a time-coordinated manner to the user. For instance, one or more of the one or more smart rings 112 may effectuate such coordination.

The sensory augmentation platform 110 may include a visual device 26. The visual device 26 is configured to generate visual images for a user to view. For example, the visual device 26 may comprise a heads-up display on a pair of worn glasses. In further instances, the visual device 26 is a screen of the computing device 120 or a television. In various instances, text, photos, images, or other visual indications are provided to a user, by the one or more smart rings 112, such as to provide for mapping, augmented reality, or other visual services. Moreover, because a user may be unfamiliar with the meaning of different haptic stimuli, a representative image may accompany each stimulus. Also, in various training scenarios, the one or more smart rings 112 may, via the network interface 116 or the body area network interface 118, connect directly to a computing device, such as a computer or a smartphone. The computer or smartphone may run a training application, such as a game, scenario based training program, tutorial, or other application whereby a user is trained to interact with the one or more smart rings 112. For example, the one or more smart rings 112 may be configured to provide haptic stimuli to a finger representing a variety of different characters or words, while showing images of the relevant character or word on the visual device 26.

The computing device 120 may be a smartphone, a tablet, a wearable computer, a portable computer, such as a laptop, or any other computing device 120 as desired. In various embodiments, the computing device 120 is an integrated processor of the smart ring 112. In various embodiments, during operation the one or more smart rings 112 connect directly to the computing device 120. In various embodiments, the computing device 120 is operatively connected to one or more of the one or more smart rings 112 and the visual device 26 by a wireless technology. For instance, the visual device 26 may be a wearable pair of glasses with a computer therein.

In some examples, the computing device 120 provides processing power and memory for the one or more smart rings 112. For instance, the one or more smart rings 112 may be small, and/or power efficient, such that processing tasks are offloaded to a connected device, such as the computing device 120. In this manner, battery life of the one or more smart rings 112 may be improved and the form factor may be miniaturized for the one or more smart rings 112.

The processing power provided by computing device 120 may be used for a variety of purposes. For instance, data may be structured and rearranged to be suitable for provision to a smart ring 112. For example, a user may wish to read a text message from a friend via electrical stimulation signals provided to a finger by a smart ring 112 worn on that finger. The computing device 120 may process the text message character-by-character or word-by-word to generate symbols or other data corresponding to the message for delivery via haptic stimulation. The symbols or other data may be then provided by the computing device 120 to the smart ring 112 in sequence or to a plurality of the one or more smart rings 112 in parallel. Moreover, the computing device 120 may set the delivery rate of the stimulation (e.g., the timing described below with reference to FIG. 2), for instance, depending on a user's proficiency in interpreting electrohaptic messages. Further, and as mentioned above, in addition to text, any human perceptible information desired to be communicated may be translated to corresponding electrical stimuli. For instance, sounds, emoji and other representative characters, scents, graphics, and/or the like may be associated with a particular sensation or set of sensations communicable via electrical stimuli.

Figure 2A:
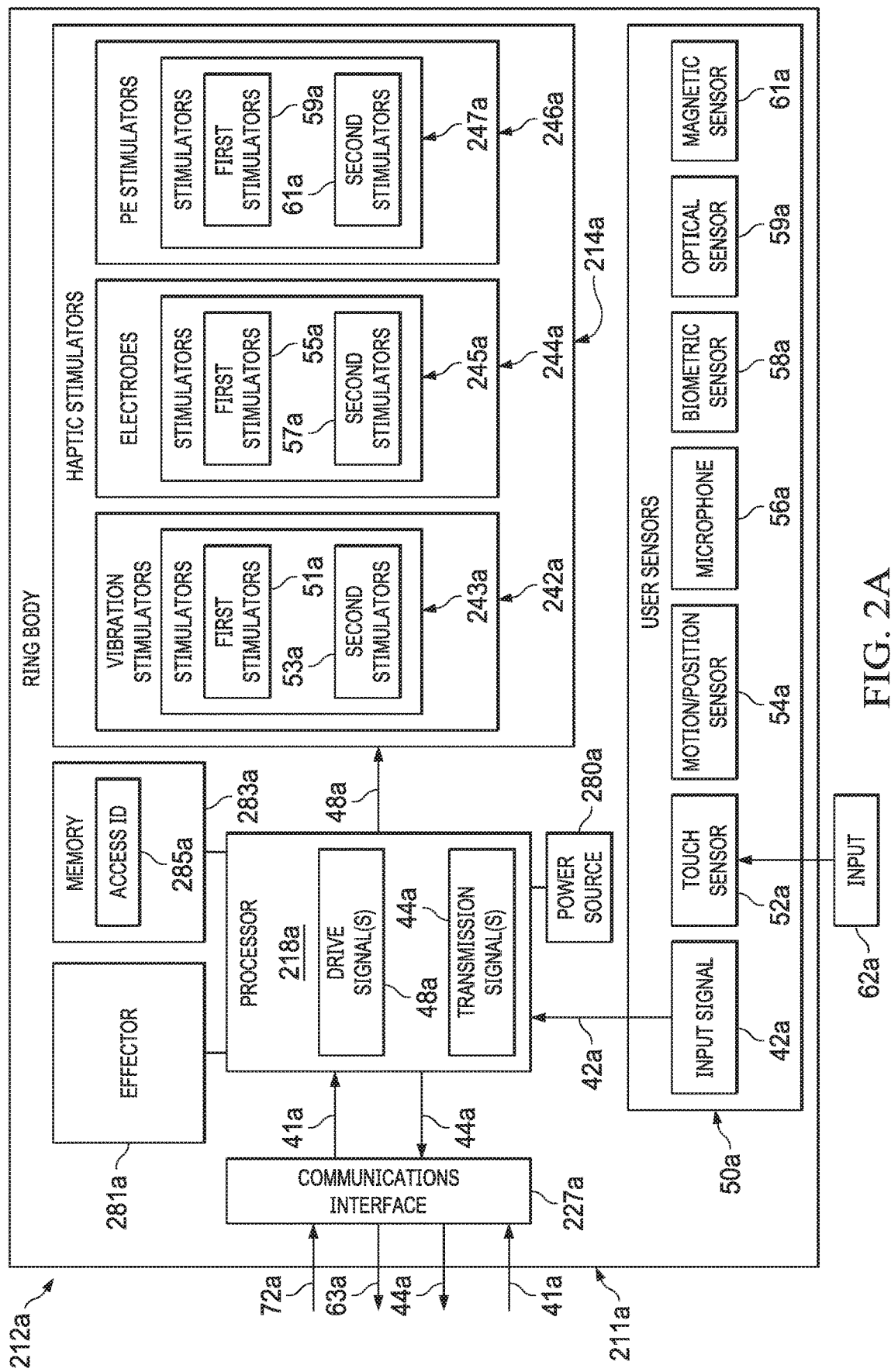
FIG. 2A illustrates an example block diagram of a smart ring, in connection with various embodiments.

With reference to FIG. 2A, an example of a smart ring 212a is disclosed. The smart ring 212a of FIG. 2A may correspond to the smart ring 112a of FIG. 1. The smart ring 212a may be configured to be worn on a first part of the user's body. For example, the first smart ring 212a may be configured to be worn on a first index finger of a user.

The smart ring 212a may comprise a ring body 211a, one or more haptic stimulators 214a coupled to the ring body 211a, a communications interface 227a coupled to the ring body 211a, and a processor 218a coupled to the ring body 211a and the one or more haptic stimulators 214a and the communications interface 227a.

The ring body 211a is a wearable loop configured to be fitted around and/or worn by a user's finger. For example, the ring body 211a may be configured to be fitted around and/or worn by a user's index finger or other finger. In some examples, the ring body 211a is rigid and is formed of one or more rigid materials, such as a metal, rigid plastic, or a combination thereof, and may include a coating. In some examples, the ring body 211a is formed of titanium or ceramic zirconia. In some examples, the ring body 211a includes a diamond like carbon coating. In other examples, the ring body 211a is semi-rigid and is formed of a semi-rigid material. In some examples, the ring body 211a may form a complete loop. Alternatively, in other examples, the ring body 211a may form a partial loop. In various embodiments, the outside surface, the inside surface, or both may be substantially circular and smooth so as to increase user comfort when wearing the smart ring 212a.

The one or more haptic stimulators 214a are any type of stimulator configured to (in response to one or more drive signals 48a from the processor 218a) provide haptic stimulation (e.g., vibration, electrical impulses, and/or pressure) to a user's body. For example, the one or more haptic stimulators 214a may be or may include a vibrator, a piezo electronic configured to put pressure on the user's finger, an electrode configured to provide an electrical stimulation to the user's finger, or combinations thereof. In some examples, the one or more haptic stimulators 214a include multiple haptic stimulators 214a. In some examples in which the one or more haptic stimulators 214a include multiple haptic stimulators 214a, a number of the one or more haptic stimulators 214a is greater than two. For example, the number of the one or more haptic stimulators 214a may be within a range of 4-12 haptic stimulators.

In some examples in which the haptic stimulator 214a includes multiple haptic stimulators 214a, the processor 218a may be configured to provide multiple of the one or more drive signals 48a, and each of the multiple drive signals 48a may correspond to a respective haptic stimulator 214a of the multiple haptic stimulators 214a. In these examples, each of the haptic stimulators 214a is configured and coupled to the processor 218a such that the haptic stimulator 214a is configured to receive a corresponding drive signal of the multiple drive signals 48a. As a result, in these examples, each of the haptic stimulators 214a is independently excitable such that different combinations of the haptic stimulators 214a can be excited.

The haptic stimulators 214a are configured such that, during operation of the smart ring 212a, the user may be able to feel haptic stimulation from the haptic stimulators 214a at various locations on the user's body on which the smart ring 212a is worn. The locations (or combinations thereof) of the haptic stimulation may correspond to different information. For instance, haptic stimulation may be felt at different positions around a finger proximate to an interior annulus of the smart ring 212a. By registering the different positions of the haptic stimulation, a user may register different messages (e.g., content of the messages or types of the message).

Additionally or alternatively, the user may be able to register different messages by registering different feelings or sensations responsive to the haptic stimulation. For example, as described in more detail below, the haptic stimulators 214a may include electrodes 244a configured to apply stimulation waveforms or signals that are configured to induce sensations in one or more nerves of the user, and the sensations associated with the different nerves may register as different feelings or sensations with the user. By registering the different feelings or sensations responsive to the haptic stimulation, a user may register different messages.

Additionally or alternatively, the user may be able to register different messages by registering characteristics of the haptic stimulation, such as duration, pulsing, and/or intensity. For example, as described in more detail below, the haptic stimulators 214a may include the vibration stimulators 242a, and the smart ring 212a may be configured to apply the haptic stimulation at different durations, pulses, and/or intensity. By registering the different characteristics of the haptic stimulation, a user may register different messages.

The haptic stimulators 214a may include vibration stimulators 242a (e.g., when the haptic stimulation includes vibration), electrodes 244a (e.g., when the haptic stimulation includes electrical impulses), and/or piezoelectric stimulators 246a (e.g., when the haptic stimulation includes pressure).

Each of the vibration stimulators 244a is configured to, when actuated responsive to the drive signal from the processor 218a, provide vibration, and may include an actuator (e.g., a motor) and a vibrating element that is configured to contact a skin of a user of the smart ring 212a when the user wears the smart ring 212a. Each of the piezoelectric stimulators 246a, when driven responsive to the one or more drive signals 48a from the processor 218a, is configured to deform (e.g., expand or contract) and create pressure on a skin of the user when the user wears the smart ring 212a.

Each of the electrodes 244a, when driven responsive to the one or more drive signals 48a from the processor 218a, is configured to transfer an electrical impulse to a skin of the user of the smart ring 212a when the user wears the smart ring 212a. In various embodiments, multiple of the electrodes 244a comprise a current source and one electrode of the electrodes 244a comprises a current sink. In further embodiments, multiple of the electrodes 244a comprise a current sink. In various embodiments, a single electrode of the electrodes 244a comprises a current source and multiple of the electrodes 244a comprise a current sink. In further embodiments, multiple of the electrodes 244a comprise the current source. The electrodes 244a may be configured to deliver electrical stimulation based on characteristics of the one or more drive signals 48a from the processor 218a. For example, the characteristics of the one or more drive signals 48a may correspond to voltage, current, waveform (e.g., defining pulse length, wave shape—such as square wave, triangle wave, sine wave, varying waveform, direct current (DC), duty cycle, etc.), and/or frequency, and the electrodes 244a may be configured to deliver electrical stimulation having a stimulation waveform based on the voltage, current, waveform, and/or frequency of the one or more drive signals 48a. Moreover, the electrodes 244a may be configurable such that an electrode's 244a role as anode or cathode may be changed and the polarity of the electrical signal(s) changed over time. Furthermore, the electrodes 244a are configured such that different electrical signals may be delivered in parallel or in sequence, and combined. Yet furthermore, electrodes 244a may be spaced, and different electrodes 244a may be energized with different electrical signals (different stimulation waveforms). In addition, electrodes 244a are configured such that they may be selectively driven so that spatial sensations (e.g., the perceived origin of the electrical stimulation) in addition to the character of the sensation itself may be changed to communicate different messages. The electrodes 244a may be configured such that an electrical signal may be passed between the electrodes 244a. Moreover, multiple electrical signals may be passed between or among the electrodes 244a.

The electrodes 244a, when driven by the one or more drive signals 48a, are configured to deliver electrical stimulation to one or more nerves or types of nerves that can be electrically stimulated to induce sensations, such as sensations of mechanical or electrical stimuli. The human body contains a variety of different nerves. Many such nerves are capable of detecting mechanical or electrical stimulus. Moreover, it has been determined that many such nerves can be electrically stimulated to induce sensations, including sensations of mechanical stimuli. The various nerves may be classified. For example, different stimuli may be perceived by different nerves. By stimulating the different nerves, different sensations may be evoked. Moreover, different nerves perceive stimuli in different spatial relation, thus different nerves may be stimulated as well, to communicate differing messages.

Figure 3:
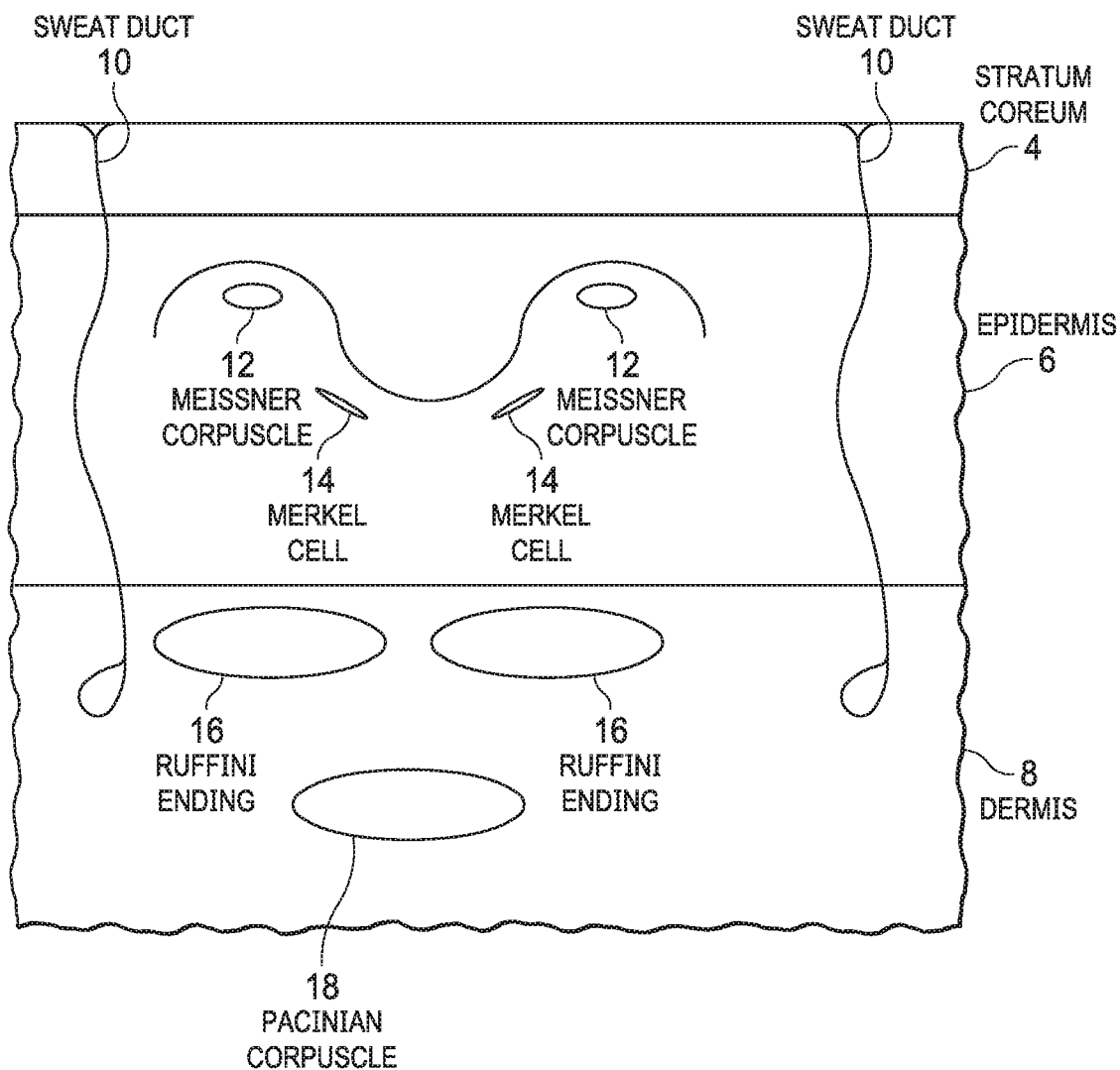
FIG. 3 illustrates an example depiction of layers of skin and human nerves, in accordance with various embodiments.

For instance, FIG. 3 illustrates four example types of nerves (a Meissner corpuscle 12, a Merkel cell 14, a Ruffini ending 16, and a Pacinian corpuscle 18) to which one or more of the electrodes 244a may be configured to deliver electrical stimulation during operation of the smart ring 212a. With reference to FIG. 3, the human skin may have a stratum corneum 4 overlaying the epidermis 6. Various nerves are present in the epidermis 6. Moreover, the epidermis 6 may overlay the dermis 8. Various nerves may also be located in the dermis 8. For context, two sweat ducts 10 are shown as well. In various instances, the Merkel cell 14 is activated by static pressure. In various instances, the Meissner corpuscle 12 is activated by time-varying vibrations, as is the Pacinian corpuscle 18. In various instances, one may appreciate that the Ruffini ending 16 and the Pacinian corpuscle 18 may have different resonant frequencies. For instance, the Ruffini ending 16 may resonate at 120 hertz (Hz) and the Pacinian corpuscle 18 at 250 Hz. Moreover, myelinated nerves may comprise insulated nerves covered by a myelin sheath with gaps spaced at Nodes of Ranvier.

The different properties of the different nerve aspects may be exploited by different types of electrical stimulation, such that stimulation having both time variant, mode variant (e.g., the type of nerves activated), location variant, intensity variant, and sequence variant, and/or other path variant characteristics can communicate large character sets and immense amounts of human-readable information. Thus, by stimulating the different nerves with different electrical signals having different waveforms, amplitude, current, and the like, it is possible to induce different sensations. For example, the Merkel cell 14 receptors may encode pressure through firing frequency. Thus, by stimulating a Merkel cell 14 receptor with a variety of different electrical impulses of different frequencies, it may also be possible to induce sensations of touch of a hard object and/or touch of a soft object. For further example, a Meissner corpuscle 12 may be stimulated to elicit a stable vibratory sensation. Moreover, stimulation of the Pacinian corpuscle 18 may facilitate the generation of location-shifted stimuli, meaning the perceived stimulus is perceived to be at a different location that the electrode applying the electrical stimuli. Thus, any and all perceptible aspects of haptic stimulation may be evoked, in addition to unique, non-haptic stimulation.

Returning to FIG. 2A, the electrodes 244a may be configured such that different combinations of electrodes 244a may be selectively excited in different patterns and with signals of different voltage, current, waveform, frequency, and/or the like so that different sensations are perceived by the user and thus can be translated by the user's nervous system into different messages. For example, a long pulse followed by a short pulse followed by a long pulse, followed again by a short pulse may correspond to the character "C," whereas a short pulse followed by a long pulse may correspond to the character "A." More complex symbolic representations are possible due to the many possible combinations of pulse length, possibilities of which electrode or electrodes of the electrodes 244a is stimulated, and possibilities of which combinations of electrodes 244a are stimulated, the voltage, current waveform, and/or frequency of each stimulation, both in sequence and in parallel, and/or the like.

The communications interface 227a may correspond to the network interface 127 described above with reference to FIG. 1. In some examples, the communications interface 227a includes the network interface 116 of FIG. 1, the body area network interface 118 of FIG. 1, or any combination thereof.

The communications interface 227a is configured to receive data 41a corresponding to information to be communicated to a user. The information to be communicated to the user may include text, images (e.g., screen content of the computing device 120 of FIG. 1), graphics, memes, phonemes, calculations, sounds, emoji, alerts, and/or any other information able to be received through other human senses. As an example, the communications interface 227a may be configured to receive the data 41a from the computing device 120 of FIG. 1, the augmentation control server 124 of FIG. 1, or both.

In some examples, the data 41a may include or indicate the information to be communicated to the user. For example, the information to be communicated to the user may include text, and the data 41a may include or indicate the text.

Alternatively or additionally, the data 41a may be based on the information to be communicated to the user but may not include or indicate the information to be communicated to the user. In these examples, the data 41a may indicate, identify, and/or instruct when and/or how the smart ring 212a should drive the haptic stimulators 214a in order to communicate the information to be communicated to the user. For example, the computing device 120 of FIG. 1 and/or the augmentation control server 124 of FIG. 1 may determine, based on the information to be communicated to the user, information corresponding to one or more drive signals 48a that the smart ring 212a should provide one or more of the haptic stimulators 214a, timing at which the smart ring 212a should apply the one or more drive signals 48a, particular stimulators of the haptic stimulators 214a that the smart ring 212a should drive at any given time, intensity of the one or more drive signals 48a, duration of the one or more drive signals 48a, and/or the sequence at which the particular stimulators should be driven, in order to communicate the information to be communicated to the user using the haptic stimulators 214a. In these examples, the data 41a may include data that indicates, that identifies, and/or that includes instructions to cause the smart ring 212a to drive one or more of the haptic stimulators 214a according to, the information corresponding to one or more drive signals 48a, the timing, the particular haptic stimulators, the intensity, the duration, and/or the sequence, in order to communicate the information to be communicated to the user.

For example, the haptic stimulators 214a may include the vibration stimulators 242a, and the data 41a may indicate signal characteristics, timing (e.g., intervals between vibrations corresponding to different elements of the information), particular vibration stimulators 243a to activate, voltage, duration, and/or the sequence at which to activate the particular vibration stimulators 243a in order to communicate the information to be communicated to the user. For example, the data 41a may indicate first particular vibration stimulators 51a to drive at a first time using the one or more drive signals 48a, and may indicate second particular vibration stimulators 53a to drive at a second time using the drive signals 48a, and the second particular vibration stimulators 53a may be different than the first particular vibration stimulators 51a.

As another example, the haptic stimulators 214a may include the electrodes 244a, and the data 41a may indicate signal characteristics (e.g., pulse duration, voltage), particular electrodes 245a to activate at any given time, timing, and the sequence at which to activate the particular electrodes 245a in order to communicate the information to be communicated to the user. For example, the data 41a may indicate first particular electrodes 55a to drive at a first time using the one or more drive signals 48a, and may indicate second particular electrodes 57a to drive at a second time using the one or more drive signals 48a, and the second particular electrodes 57a may be different than the first particular electrodes 55a.

As another example, the haptic stimulators 214a may include the piezoelectric stimulators 246a, and the data 41a may indicate signal characteristics (e.g., pulse duration, voltage), particular piezoelectric stimulators 247a to activate at any given time, and the sequence at which to activate the particular piezoelectric stimulators 247a in order to communicate the information to be communicated to the user. For example, the data 41a may indicate first particular piezoelectric stimulators 59a to drive at a first time using the one or more drive signals 48a, and may indicate second particular piezoelectric stimulators 61a to drive at a second time using the one or more drive signals 48a, and the second particular piezoelectric stimulators 61a may be different than the first particular piezoelectric stimulators 59a.

The processor 218a is configured to receive the data 41a and to generate and provide the one or more drive signals 48a (e.g., control signals, drive instructions) to the one or more haptic stimulators 214a based on the data 41a. The processor 218a may be an embedded computing device, a processor and memory, or any other programmable electronic device or circuit configured to receive the data 41a and to send the drive signal 48a to the one or more haptic stimulators 214a. The drive signal 48a is configured to drive or activate the haptic stimulator 214a to communicate the information to be communicated to the user. In some examples, as explained above, the haptic stimulator 214a includes multiple haptic stimulators 214a. In these examples, the processor 218a may be configured to provide multiple drive signals 48a, and each of the multiple drive signals 48a may correspond to a respective haptic stimulator 214a of the multiple haptic stimulators 214a. In these examples, each of the haptic stimulators 214a is configured and coupled to the processor 218a such that the haptic stimulator 214a is configured to receive a corresponding drive signal 48a of the multiple drive signals 48a. As a result, in these examples, each of the haptic stimulators 214a is independently excitable such that different combinations of the haptic stimulators 214a can be excited.

In some examples, as explained above, the data 41a may include or may indicate the information to be communicated to a user. In these examples, the processor 218a may be configured to translate the data 41a to determine which of the haptic stimulators 214a to drive and when and/or how the smart ring 212a should drive the haptic stimulators 214a in order to communicate the information to be communicated to the user. For example, the processor 218a may determine, based on the information to be communicated to the user included or indicated in the data 41a, characteristics of the drive signals 48a that the smart ring 212a should provide one or more of the haptic stimulators 214a, timing at which the smart ring 212a should apply the drive signals 48a, duration of the drive signals 48a, intensity of the drive signals 48a, and/or particular haptic stimulators 214a that the smart ring 212a should drive at any given time, in order to communicate the information to be communicated to the user. In these examples, subsequent to determining the characteristics of the drive signals 48a, the timing, the duration, the intensity, and/or the particular haptic stimulators 214a, the processor 218a generates the drive signals 48a to drive the particular haptic stimulators 214a according to the determined characteristics, timing, duration, and intensity.

In some examples in which the data 41a includes or indicates the information to be communicated to the user, the information to be communicated to the user includes text. In some of these examples, the processor 218a is configured to process the data 41a to generate the drive signals 48a to drive different haptic stimulators 214a for different characters of the text. For example, each letter of an alphabet (e.g., the English alphabet) may correspond to a different pattern of activated haptic stimulators 214a, and the processor 218a may be configured to generate the drive signals 48a based on the letters in the text and the patterns corresponding to the letters in the text to drive particular haptic stimulators of the haptic stimulators 214a in a sequence corresponding to the sequence of the letters in the text and according to the patterns corresponding to the letters in the text. In some examples, the patterns of haptic stimulators corresponding to letters in an alphabet may be based on or correspond to vertices or other index points on a represented character.

In an example, the drive signals 48a are configured to drive one or more first haptic stimulators of the one or more haptic stimulators 214a to communicate a first character of the text. In this example, the drive signals 48a are also configured to drive one or more second haptic stimulators of the one or more haptic stimulators 214a to communicate a second character of the text. In this example, the one or more second haptic stimulators include at least one haptic stimulator that the one or more first haptic stimulators do not include.

To illustrate, the information to be communicated to a user may include the word "Apple," and the data 41a may include the word "Apple" or may otherwise indicate that the word "Apple" is to be communicated to the user. In this example, the processor 218a may be configured to determine characteristics of the drive signals 48a, the timing, and/or the particular haptic stimulators 214a as described below with reference to FIGS. 4A-4F based on receiving the word "Apple" included in or otherwise indicated by the data 41a. In this example, the processor 218a then generates the drive signals 48a according to the characteristics, the timing, and/or the particular haptic stimulators 214a determined according to the data 41a indicating or identifying the word "Apple" and described below with reference to FIGS. 4A-6F, and provides the drive signals 48a to the particular haptic stimulators 214a described below with reference to FIGS. 4A-6F according to the timing described below with reference to FIGS. 4A-6F.

Returning to FIG. 2A, the data 41*a* may indicate, identify, and/or instruct which of the haptic stimulators 214*a* to drive and when and/or how the smart ring 212*a* should drive the haptic stimulators 214*a* in order to communicate the information to be communicated to the user. In these examples, the data 41*a* may include data that indicates, that identifies, and/or that includes instructions to cause the sensory augmentation system 212*a* to drive one or more of the haptic stimulators 214*a* according to, characteristics of the drive signals 48*a*, timing, duration, intensity, and/or particular haptic stimulators 214*a*, indicated or identified by the data 41*a* in order to communicate the information to be communicated to the user. In these examples, the processor 218*a* processes the data 41*a* to obtain the characteristics, the timing, the duration, the intensity, and/or the particular haptic stimulators 214*a* indicated, identified, and/or instructed by the data 41*a*.

To illustrate, the information to be communicated to a user may include the word "Apple," and the data 41*a* may identify or indicate characteristics of the drive signals 48*a*, timing, duration, intensity, and particular haptic stimulators 214*a* described below with reference to FIGS. 4A-4F. In this example, the processor 218*a* may be configured to process the data 41*a* to obtain the characteristics, the timing, the duration, the intensity, and/or the particular haptic stimulators 214*a* indicated by the data 41*a* and described below with reference to FIGS. 4A-4F, and may generate the drive signals 48*a* to drive the particular haptic stimulators 214*a* described below with reference to FIGS. 4A-4F using the drive signals 48*a* according to the timing described below with reference to FIGS. 4A-4F.

In some examples, because the haptic stimulators 214*a* typically will require a higher voltage electrical waveform than many microprocessors generate, in various embodiments, the processor 218*a* includes and/or uses an H-bridge, or a buck/boost converter, or one or more capacitors for discharging, or one or more transformers, coils, and/or the like to generate the drive signals 48*a*.

The smart ring 212*a* may include a power source 280*a*. The power source 280*a* comprises a source of electrical energy. The power source 280*a* may be a battery, or a super capacitor. The power source 280*a* may include a charger, such as to harvest RF energy, body heat, motion of the user, and/or the like. The power source 280*a* may include an inductive charger, such as to facilitate recharging of a battery or super capacitor by exposure to an electromagnetic field. The power source 280*a* is coupled to the processor 218*a*, and may be configured to enable the processor 218*a* to drive the one or more haptic stimulators 214*a* with sufficient energy to activate the one or more haptic stimulators 214*a*.

In some examples, the smart ring 212*a* may additionally include an effector 281*a*. The effector 281*a* may comprise a visual indicator, such as a light source, or an electronically-controlled display or pattern provided by a liquid crystal display (LCD), electronic ink and/or any type of human perceptible indicator as desired. The effector 281*a* may further comprise non-human readable mechanisms, such as a near field communications (NFC) device configured to effect financial transactions and/or any other function as desired. In some embodiments, the effector 281*a* may be combined with the touch sensor 52*a*.

In some examples, the smart ring 212*a* additionally or alternatively includes one or more user sensors 50*a* coupled to the ring body 211*a* and configured to detect input 62*a* from a user of the smart ring 212*a*. The one or more user sensors 50*a* are configured to convert the input 62*a* into an input signal 42*a* and provide the input signal 42*a* to the processor 218*a*. The one or more user sensors 50*a* comprise a touch sensor 52*a*, one or more position sensors 54*a*, a microphone 56*a*, one or more biometric sensors 58*a*, an optical sensor 59*a*, a magnetic sensor 61*a*, or any combination thereof. The one or more user sensors 50*a* may be coupled to an exterior and/or interior side of the ring body 211*a* and/or may be embedded within the ring body 211*a*. For example, the touch sensor 52*a* may include one or more touch sensors 52*a* disposed on an exterior annular surface of the ring body 211*a*. As another example, the position sensor 54*a* may include one or more position sensors 54*a* coupled to or embedded within the ring body 211*a*. As another example, the microphone 56*a* may be coupled to an exterior annular surface of the ring body 211*a*. As another example, the biometric sensors 58*a* may include one or more biometric sensors disposed on an interior surface of the ring body 211*a*.

The touch sensor 52*a* may be any type of sensor configured to detect touch input from a user. For example, the touch sensor 52*a* may be a capacitive touch sensor. In examples in which the one or more user sensors 50*a* include the touch sensor 52*a*, the input 62*a* from the user of the smart ring 212*a* includes touch input. In these examples, the input signal 42*a* includes a location, number, and/or duration of the touch inputs. In some examples, the touch input 62*a* comprises one of a single tap, a double tap, or a deep tap. The touch sensor 52*a* may be configured such that different locations on the touch sensor 52*a* correspond to respective information input, such as human readable message elements or control instructions. In some examples, a user may stimulate the touch sensor 52*a* such as by forming a hand having the smart ring 212*a* into a fist, and using a finger of another hand to touch the external annular surface of the smart ring 212*a*.

For example, the touch sensor 52*a* may be configured such that different locations on the touch sensor 52*a* correspond to respective human readable message elements, and the user may provide touch input at locations of the touch sensor 52*a* that correspond to the human readable message elements the user desires to include in a message (e.g., a short message service (SMS) message). For example, the user may wish to communicate a text message formed of text characters, and may provide touch input on the touch sensor 52*a* at locations corresponding to the text characters. The smart ring 212*a* may thus be configured to receive, via touch input, human readable message elements of a message the user desires to communicate.

As another example, the touch sensor 52*a* may be configured such that different locations on the touch sensor 52*a* correspond to respective control instructions for controlling the smart ring 212*a* or another device, and the user may provide touch input at locations of the touch sensor 52*a* that correspond to the control action the user desires to effect. To illustrate, the user may wish to disable communication using the ring, and may provide touch input on the touch sensor 52*a* at a location of the touch sensor 52*a* that corresponds to disabling communication on the smart ring 212*a*. As another example, the user may wish to disable the haptic stimulators on the smart ring 212*a*, and the user may provide touch input on the touch sensor 52*a* at a location of the touch sensor 52*a* that corresponds to disabling the haptic stimulators 214*a*. As another example, the smart ring 212*a* may serve as a remote control to change the channel of a television. In this example, different locations of the touch sensor 52*a* may correspond to respective control instructions for controlling the television, and the user may provide touch input at a location on the touch sensor 52*a* that corresponds to changing the channel on the television. The smart ring 212a may thus be configured to receive, via touch input, control instructions for controlling the smart ring 212a or another device.

In some examples, the touch sensor 52a is further configured to identify a fingerprint of the user and transmit user fingerprint data to the processor 218a. In some examples, the user fingerprint data is used to power on, power off, or unlock the smart ring 212a.

In some examples, the touch sensor 52a additionally or alternatively includes a capacitive touch screen that can display messages to the user.

The position sensor 54a may be any type of sensor configured to obtain position data. For example, the position sensor 54a may be or may include one or more accelerometers, a gyroscope, or a combination thereof. The position sensor 54a may be configured to detect motion in six degrees of freedom. For example, the position sensors 54a may include accelerometers that can calculate movement of the ring in three dimensions of a Cartesian coordinate system, as well as rotation about any of the Cartesian coordinate axes (e.g. roll, pitch and yaw). The position sensors may also include global positioning system (GPS), wireless (e.g. WiFi or cellular) triangulation, or any other means to determine position. In examples in which the one or more user sensors 50a include the position sensor 54a, the input 62a from the user of the smart ring 212a includes motion or position information (e.g., position data) of the smart ring 212a (and correspondingly motion or position information a user of the smart ring 212a) from the one or more accelerometers and/or the gyroscope. In these examples, the input signal 42a includes or indicates motion corresponding to the motion or position information. In these examples, the input signal 42a includes position changes in three dimension of a Cartesian coordinate system.

In some examples, the input 62a comprises motion information of the user corresponding to human readable message elements or to control instructions regarding the smart ring 212a or another device. For example, different motions may correspond to respective human readable message elements, and the position sensor 54a may be configured to detect the different motions. To illustrate, different hand motions corresponding to, for example, sign language, may correspond to respective words, and the position sensor 54a may be configured to detect motion corresponding to the different hand motions. The smart ring 212a may thus be configured to receive, via motion detection, human readable message elements of a message the user desires to communicate.

As another example, different hand motions may correspond to respective control instructions. To illustrate, a shake or vibration hand motion may correspond to disregarding an incoming message, and the position sensor may be configured to detect the shake hand motion. The smart ring 212a may thus be configured to receive, via motion detection, control instructions to control the smart ring 212a or another device.

The microphone 56a may be configured to detect sound. In examples in which the one or more user sensors 50a comprise the microphone 56a, the input 62a from the user of the smart ring 212a includes voice input. In these examples, the input signal 42a includes or indicates voice data corresponding to the voice input. The voice input may correspond to human readable message elements that the user desires to include in a message. Alternatively or additionally, the voice input may correspond to control instructions for controlling the smart ring 212a or another device.

The biometric sensors 58a may be any sensor configured to detect biometric data of a user, such as temperature, heart rate, blood pressure, oxygen level, perspiration level, breathing rate, steps taken, or any combination thereof. In examples in which the one or more user sensors 50a include the biometric sensors 58a, the input 62a comprises biometric data of the user. In these examples, the input signal 42a includes or indicates the biometric data.

The optical sensor 59a is oriented outward from the ring such that the optical sensor 59a is oriented towards an end of the finger when the smart ring 212a is worn by the user. The optical sensor 59a may include a light source, a measuring device, a camera, and/or a sensor (e.g., a photodetector configured to receive a pre-determined wavelength range (e.g. the visual spectrum)). The sensor of the optical sensor 59a is configured to sense light received at the optical sensor 59a (e.g., light that was transmitted by the light source and reflected by the item or light that was transmitted by a light source on the item) and measure the light. The optical sensor 59a is configured to provide information corresponding to the measured light to the processor 218a as the input signal 42a.

The magnetic sensor 61a is configured to detect the presence of other nearby smart rings.

In examples in which the smart ring 212a includes the one or more user sensors 50a, the processor 218a is additionally or alternatively configured to receive the input signal 42a from the one or more user sensors 50a and generate one or more transmission signals 44a based on the input signal 42a. The processor may be configured to generate the one or more transmission signals 44a based on the input signal 42a by packaging the input signal 42a for transmission to a second device, such as the computing device 120 of FIG. 1 or the augmentation control server 124 of FIG. 1. Additionally or alternatively, in examples in which the one or more user sensors 50a include the optical sensor 59a, the processor 218a is configured to generate the one or more transmission signals 44a to include the information corresponding to the measured light. The processor 218a is configured to provide the one or more transmission signals 44a to the communications interface 227a. The communications interface 227a is configured to receive the one or more transmission signals 44a from the processor 218a, and to transmit the one or more transmission signals 44a to the second device. The communications interface 227a may use the human body interface 116 of FIG. 1, the network interface 118 of FIG. 1, or both, to transmit the one or more transmission signals 44a to the second device.

The ring 212a may additionally include one or more external ports (e.g., one or more micro-USB ports, etc.) for charging and wired communication.

In some examples, the smart ring 212a may additionally or alternatively be configured to enable access to a second device. In these examples, the communications interface 227a is additionally or alternatively configured to receive data 72a indicating a near field frequency associated with access permission for accessing a second device. The second device may be any device that is accessed (e.g., unlocked, started) by or using (or that includes a function accessed by or using) a key (e.g., a radio frequency (RFID) key). For example, the second device may include an automated door lock. As another example, the second device may include a vehicle or a vehicle's engine. The data 72a may be received from the key or from another device.

In examples in which the smart ring 212a is configured to enable access to a second device, the processor 218a is configured to obtain the near field frequency based on the data 72*a* by processing the data 72*a*. The smart ring 212*a* may further be configured to enable accessing the second device by transmitting, using the communications interface 227*a*, a signal 63*a* corresponding to the near field frequency. Transmitting the signal 63*a* corresponding to the near field frequency when the smart ring 212*a* is within a threshold distance of the second device enables accessing the second device. For example, transmitting the signal corresponding to the near field frequency when the smart ring 212*a* is within a threshold distance from a vehicle may enable a user to start a vehicle by pushing a start button on the vehicle without the vehicle key being within the threshold distance from the vehicle.

In some examples, the smart ring 212*a* further includes a memory 283*a* coupled to the processor 218*a* and including an access identifier (ID) 285*a*. In these examples, the communications interface comprises a near field communications (NFC) interface that is configured to communicate the access ID 285*a* to a security reader external to the smart ring 212*a*.

Figure 2B:
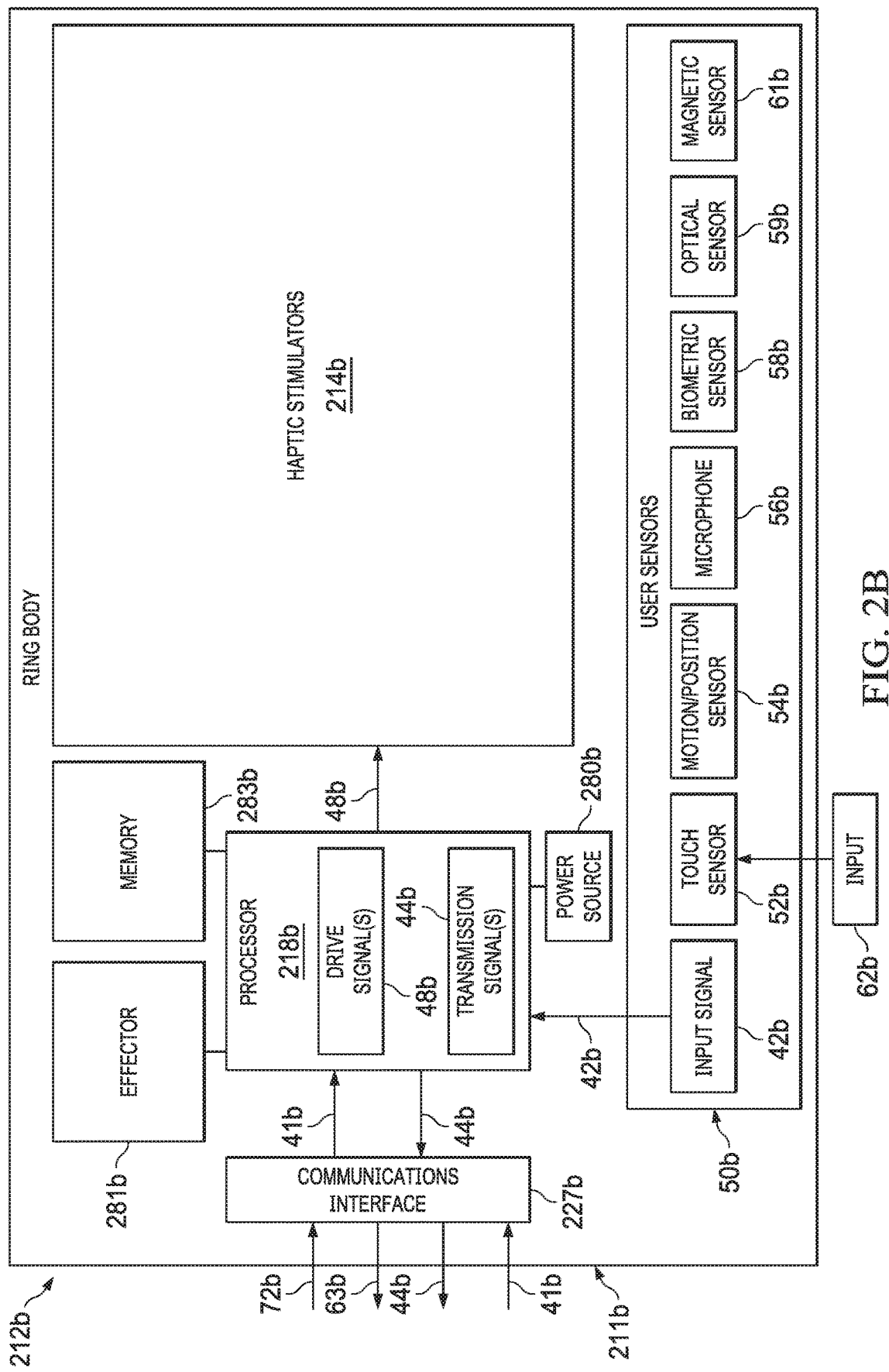
FIG. 2B illustrates an example block diagram of a smart ring, in connection with various embodiments.

FIG. 2B illustrates an example of a smart ring 212*b*. The smart ring 212*b* may correspond to any smart ring of the one or more smart rings 112 of FIG. 1. For example, the smart ring 212*b* may correspond to the smart ring 112*b* of FIG. 1. The smart ring 212*b* may be configured to be worn on a second part of the user's body (e.g., a different finger than the finger on which the smart ring 212*a* of FIG. 2A is worn). The smart ring 212*b* may comprise a ring body 211*b*, haptic stimulators 214*b* coupled to the ring body 211*b*, a communications interface 227*b* coupled to the ring body 211*b*, a processor 218*b* coupled to the ring body 211*b*, haptic stimulators 214*b* coupled to the processor 218*b*, a memory 283*b* coupled to the processor 218*b*, one or more user sensors 50*b* coupled to the processor 218*b*, and a communications interface 227*b* coupled to the processor 218*b*.

The ring body 211*b* may be configured as described above with reference to the ring body 211*a*, the haptic stimulators 214*b* may be configured as described above with reference to the haptic stimulators 214*a*, the communications interface 227*b* may be configured to perform any of the functions described above with reference to the communications interface 227*a*, and the processor 218*b* may be configured to perform any of the functions described above with reference to the processor 218*b*.

The smart ring 212*b* may be configured to receive data 41*b*. The data 41*b* may correspond to the data 41*a*. The processor 218*a* may be configured to process the data 41*b* to generate one or more drive signals 48*b* that correspond to the one or more drive signals 48*a* described above with reference to the smart ring 212*a*. The processor 218*a* may be configured to provide the one or more drive signals 48*b* to drive the one or more haptic stimulators 214*b* as described above with reference to the processor 218*a* and the one or more haptic stimulators 214*a* of the smart ring 212*a*.

In some examples, the data 41*b* additionally or alternatively includes data that indicates that the smart ring 212*a* is going to communicate (e.g., imminently communicate) the information described above with reference to the smart ring 212*a* and/or that indicates the type of the information (e.g., text message). In these examples, the processor 218*b* is configured to process the data 41*b* to generate the drive signals 48*b*, and may provide the drive signals 48*b* to the haptic stimulators 214*b* to communicate that the smart ring 212*a* is going to communicate (e.g., imminently communicate) the information described above with reference to the smart ring 212*a* and/or that indicates the type of the information (e.g., text message). In this manner, the smart ring 212*a* may be configured to communicate content of a message, and the smart ring 212*b* may be configured to communicate that the smart ring 212*a* is going to receive content of the message and to communicate the type of the message.

The one or more user sensors 50*b* that correspond to or function as described above with reference to, the one or more user sensors 50*a*. For example, the smart ring 212*b* may additionally include a touch sensor 52*b*, a position sensor 54*b*, a microphone 56*b*, a biometric sensor 58*b*, an optical sensor 59*b*, and/or a magnetic sensor 61*b*, that respectively correspond to the touch sensor 52*a*, the position sensor 54*a*, the microphone 56*a*, the biometric sensor 58*a*, the optical sensor 59*a*, and/or the magnetic sensor 61*a* described above with reference to the smart ring 212*a*.

The smart ring 212*b* additionally or alternatively includes an effector 281*b* coupled to the processor 218*b*, and a power source 280*b* coupled to the processor 218*b*. The effector 281*b* may be configured as described above with reference to the effector 281*a* of FIG. 2A, and the power source 280*b* may be configured as described above with reference to the power source 280*a*. The smart ring 212 may be configured to receive input 62*b* as described above with reference to the input 62*a* of FIG. 2A. The one or more user sensors 50*b* may be configured to generate an input signal 42*b* as described above with reference to the input signal 42*a* of FIG. 2A. The smart ring 212*b* may be configured to receive the signal 63*b* as described above with reference to the signal 63*a* of FIG. 2A. The smart ring 212*b* may additionally or alternatively be configured to receive data 72*b* as described above with reference to the data 72*a* of FIG. 2A.

With reference to FIGS. 4A-4F, FIG. 4A illustrates example rings 412*a* and 412*b* including examples of haptic stimulators 414*a* and 414*b*, and FIGS. 4B-4F illustrate an example sequence of the haptic stimulators 414*a* that may be activated by the ring 412*a*. The rings 412*a* and 412*b* of FIG. 4A may correspond to the one or more smart rings 112 of FIG. 1 and/or to the smart rings 212*a* and 212*b* of FIGS. 2A and 2B. The haptic stimulators 414*a* and 414*b* of FIG. 4A may correspond to the haptic stimulators 214*a* or 214*b* illustrated in FIGS. 2A and 2B. The haptic stimulators 414*a* and 414*b* are evenly spaced around the interior annulus of the ring bodies of the rings 412*a* and 412*b*. In some examples, two rings may be used so that two rings 412*a* and 412*b* are controlled in concert. For instance, one ring 412*a* may communicate to the user the nature and character of the content presently or imminently communicated by the other ring 412*b*. For instance, one ring 412*b* may communicate to the user that an incoming text message has been received, while the other ring 412*a* may communicate the content of the text message simultaneously or imminently thereafter.

The haptic stimulators 414*a* and 414*b* may comprise twelve haptic stimulators. In further instances, any number of haptic stimulators 414*a* and 414*b* may be selected. The haptic stimulators 414*a* and 414*b* may correspond to different locations around the ring body. For ease of viewing, the reference numbers 414*a* and 414*b* are only shown in connection with some of the twelve haptic stimulators 414*a* and 414*b* illustrated in FIGS. 4A-4F.

In various instances, an English word is desired to be communicated to a user. For instance, the world "APPLE" is desired to be communicated. While the haptic stimulators 414*a* may communicate symbols, phonemes, or any other communicative device representable by haptic stimulation, in this non-limiting example, individual characters are communicated in sequence to comprise a word. For instance, FIG. 4B shows three haptic stimulators being energized. The haptic stimulators correspond to vertices or other index points on a represented character. For instance, for the letter A, haptic stimulators 414a at positions 0, 7, and 5 may be energized. The number associated with the haptic stimulator corresponds to its clock position in this example, so the haptic stimulators 414a at the 12 o'clock, 5 o'clock, and 7 o'clock positions are activated, corresponding to the three ends of the letter "A". At a second moment in time, a different set of haptic stimulators 414a may be activated to correspond to the second letter in the word, "APPLE."

Figure 4A:
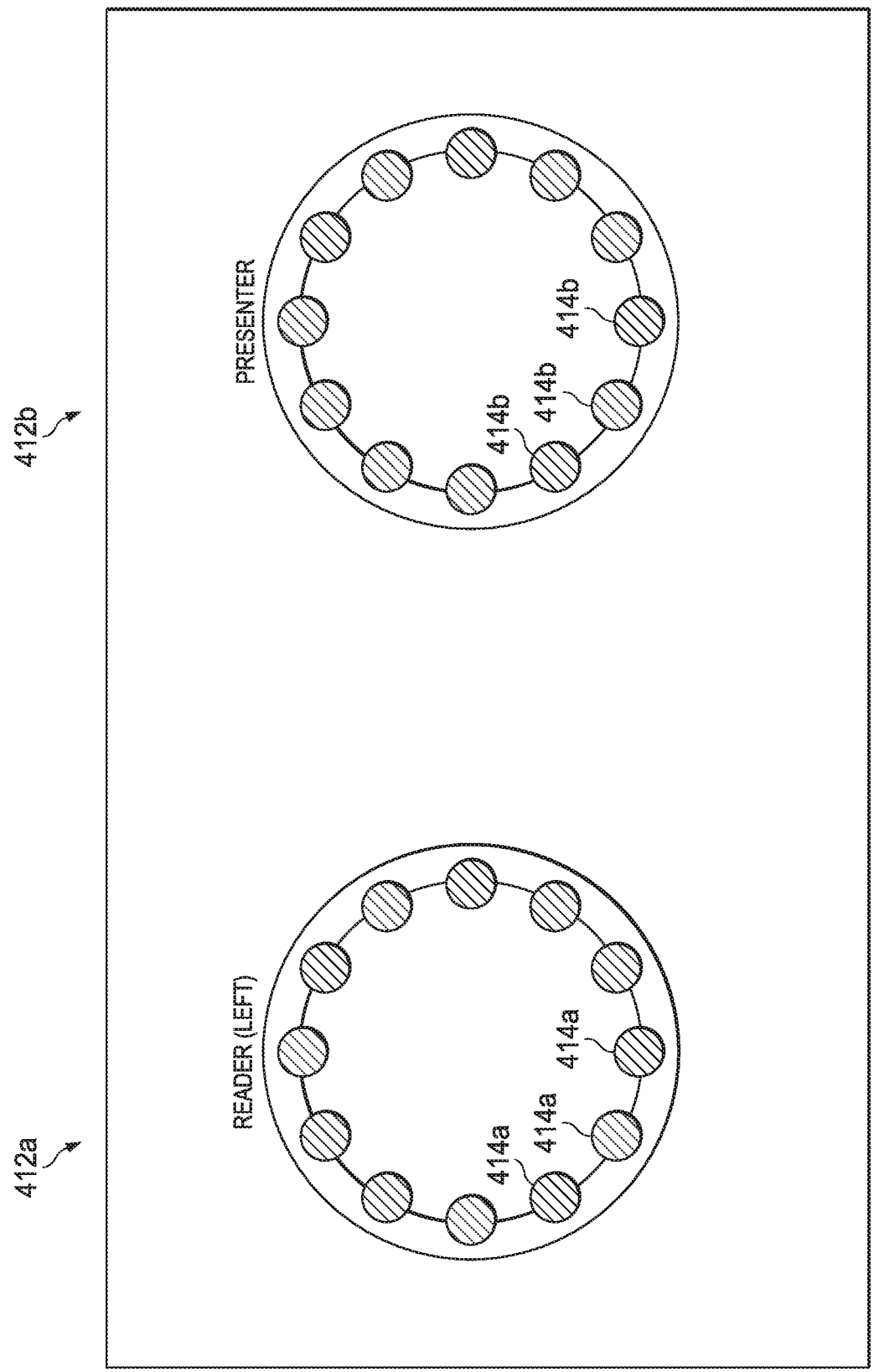
FIG. 4A shows an example of a smart ring, such as the smart ring of FIGS. 1 and 2A and 2B, and that includes haptic stimulators, in accordance with various embodiments.
Figure 4B:
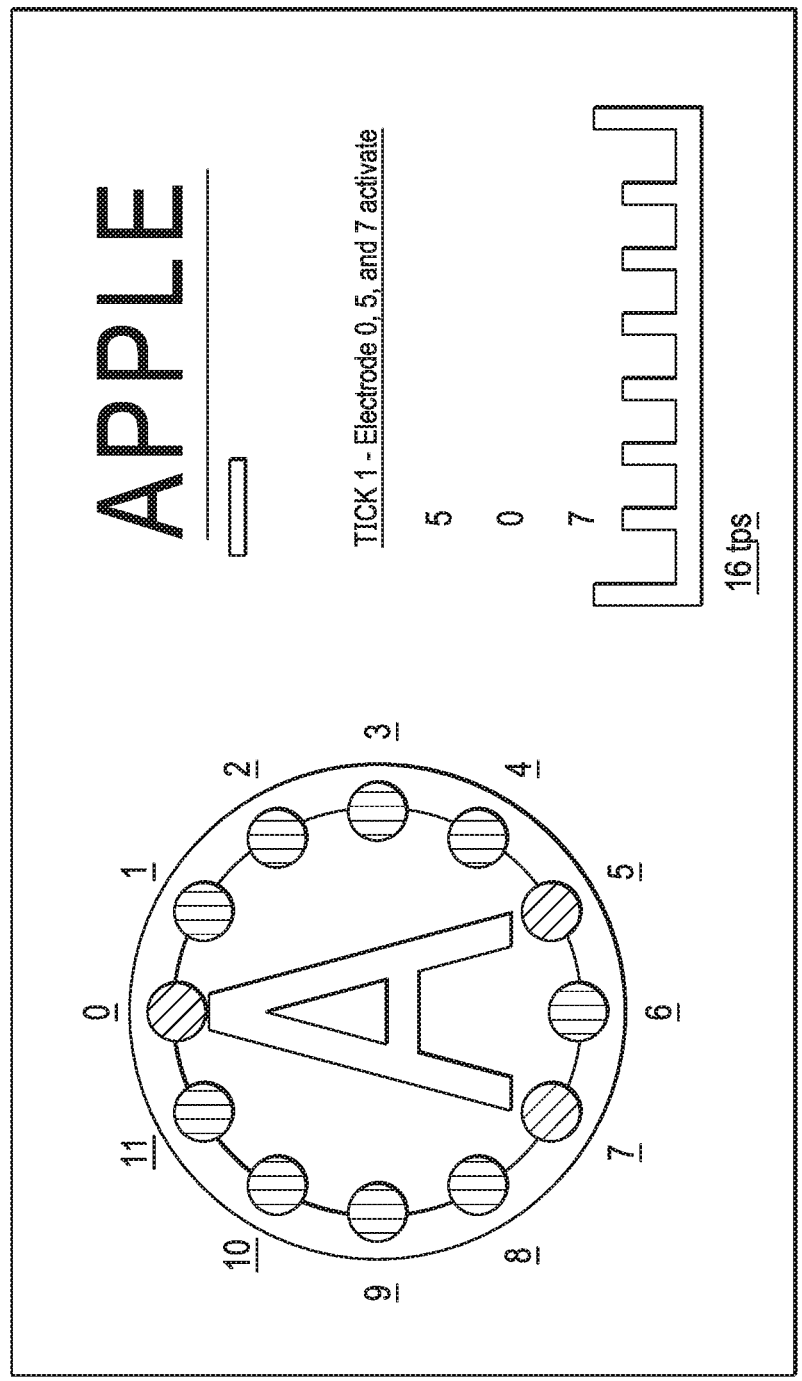
FIGS. 4B-4F depict an example schema for communicating a multi-character English word to a user by activating different haptic stimulators of the smart ring of FIG. 4A, in accordance with various embodiments.
Figure 4C:
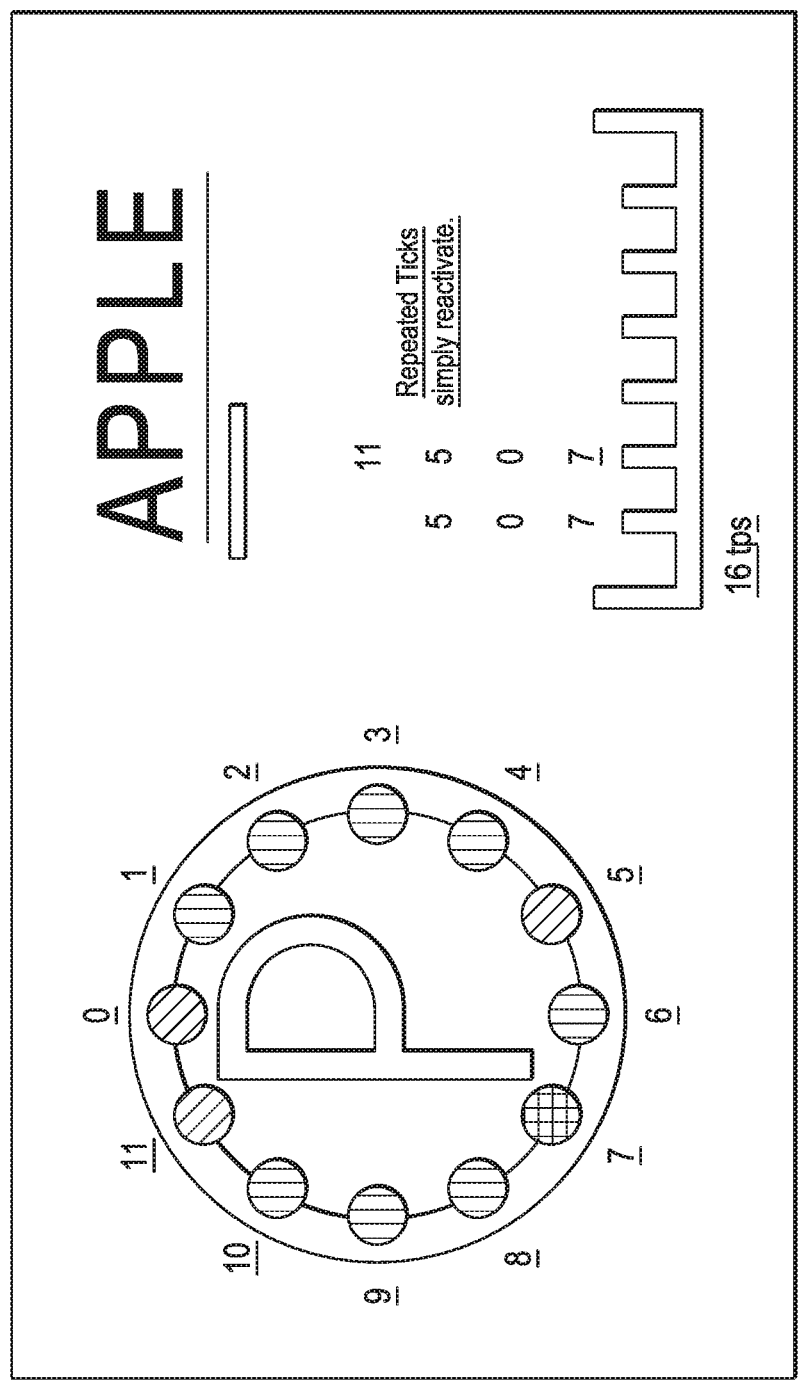

With reference to FIGS. 4A and 4C, haptic stimulators 414a at positions 5 and 0 remain activated, and the haptic stimulator 414a at position 7 is momentarily pulsed off then back on, and the haptic stimulator at position 11 is activated. In this manner, one may appreciate that the next letter, "P" is indicated, while the haptic stimulators 414a associated with the first letter, "A," in some embodiments, remain activated to facilitate remembering by the user of the earlier character.

Figure 4D:
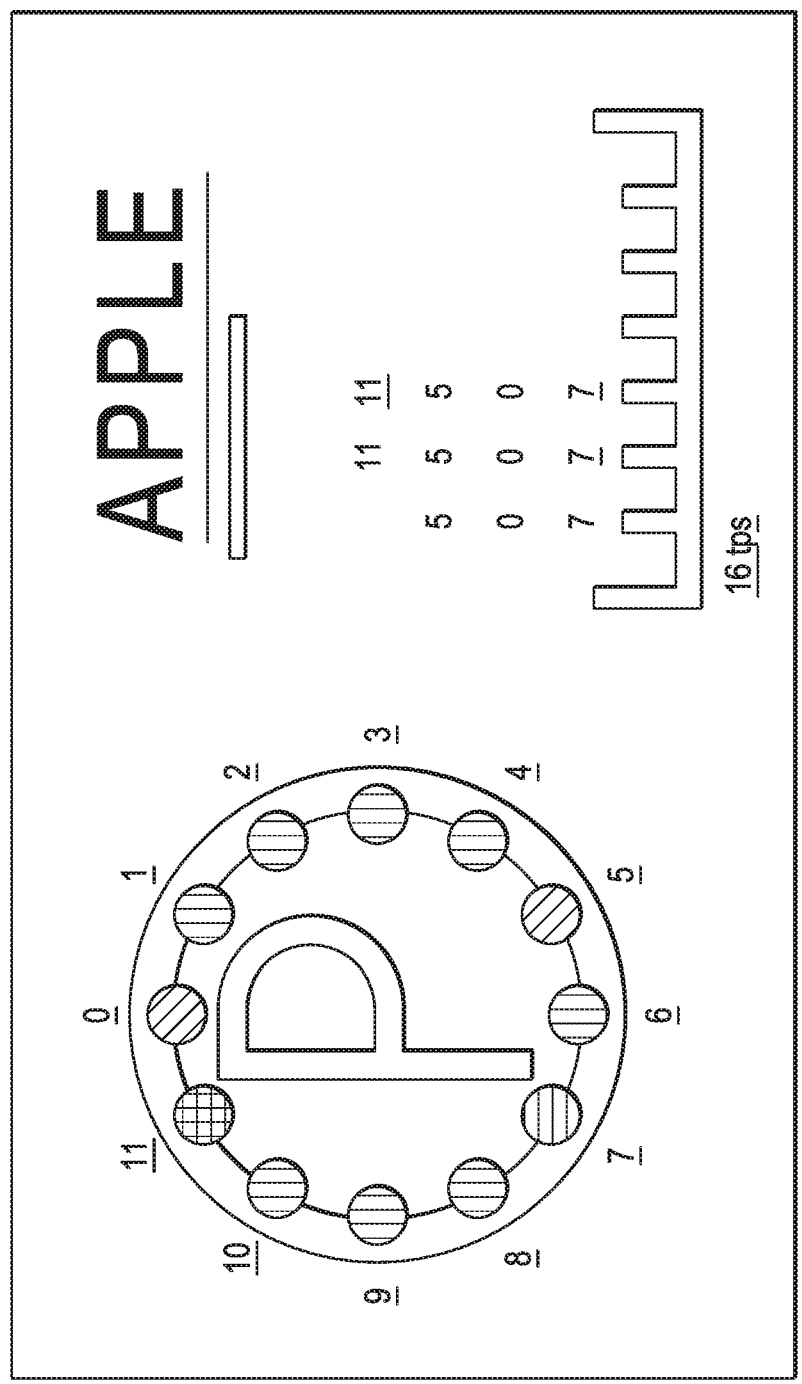

Turning now to FIGS. 4A and 4D, one may note that a second letter "P" is desired to be indicated. However, in order to indicate two identical characters in a row, a further temporal aspect is implemented. Specifically, the haptic stimulators 414a corresponding to the letter P are pulsed off and then on again to represent a second sequential instance of the character. Haptic stimulators 414a previously associated with the letter "A" and not with the letter "P" may be left remaining active and not pulsed.

Figure 4E:
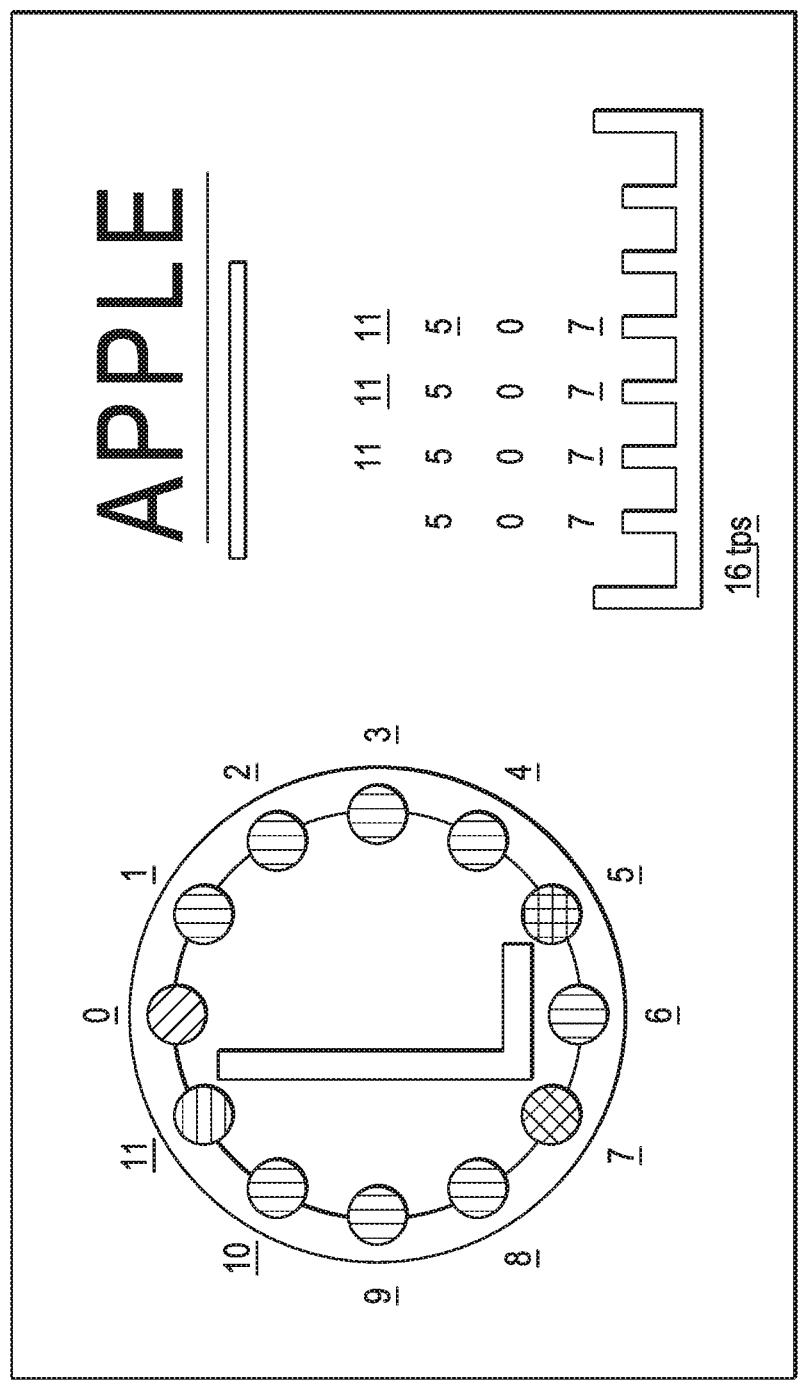

Subsequently, and with reference to FIGS. 4A and 4E, the next character, "L," is communicated. Haptic stimulators 414a at positions 11 and 7 are pulsed off and back on, as these haptic stimulators 414a were also associated with the letter "P" and the haptic stimulator 414a at position 5 is activated. The haptic stimulator 414a at position 0 has remained activated and is unchanged.

Figure 4F:
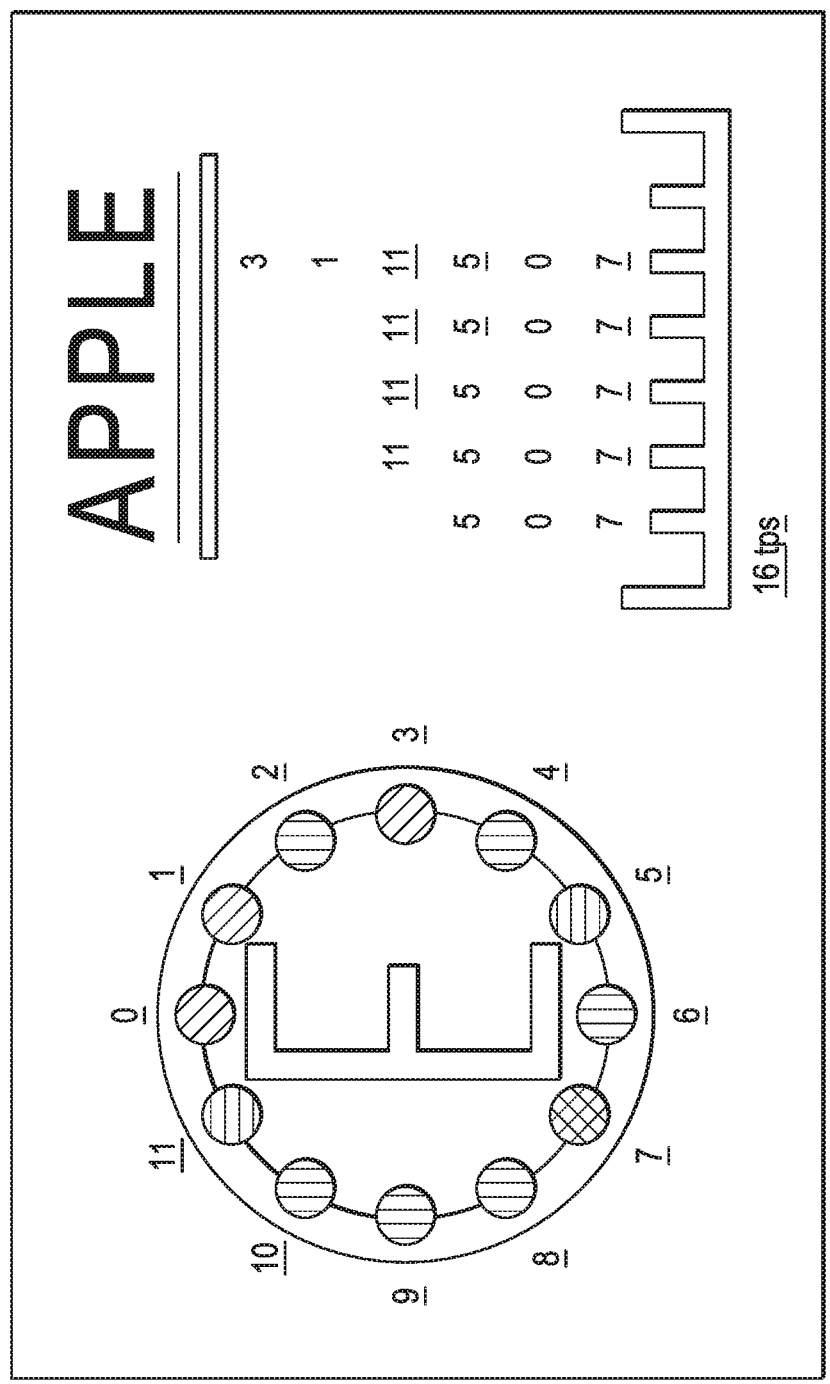

Finally, shifting focus to FIGS. 4A and 4F, the final letter, "E," is communicated. Haptic stimulators 414a at positions 3, 1, 11, 7, and 5 are all associated with the letter "E." Haptic stimulators 414a at positions 11, 7, and 5 are pulsed off and back on, haptic stimulators 414a at positions 3 and 1 are activated, and the haptic stimulator 414 at position 0 remains activated and is unchanged.

In various embodiments, each letter, character, phoneme, or other symbol is associated with an equal-duration period of time (a "tick"). Each tick may be of a length sufficient to permit the user to identify the character, phoneme, or other symbol being communicated. Thus, the tick length may be shortened as a user gains proficiency. In various embodiments, following the final letter of a word or other collection of symbolically represented information, all haptic stimulators 414 are deactivated for a single tick, signaling the end of the word or other collection of symbolically-represented information. With reference to FIG. 4F, following the elapse of one tick for the final letter "E," each haptic stimulator 414a may be deactivated for one tick, signaling the end of the word, prior to beginning presentation of subsequent user readable stimuli.

Figure 5:
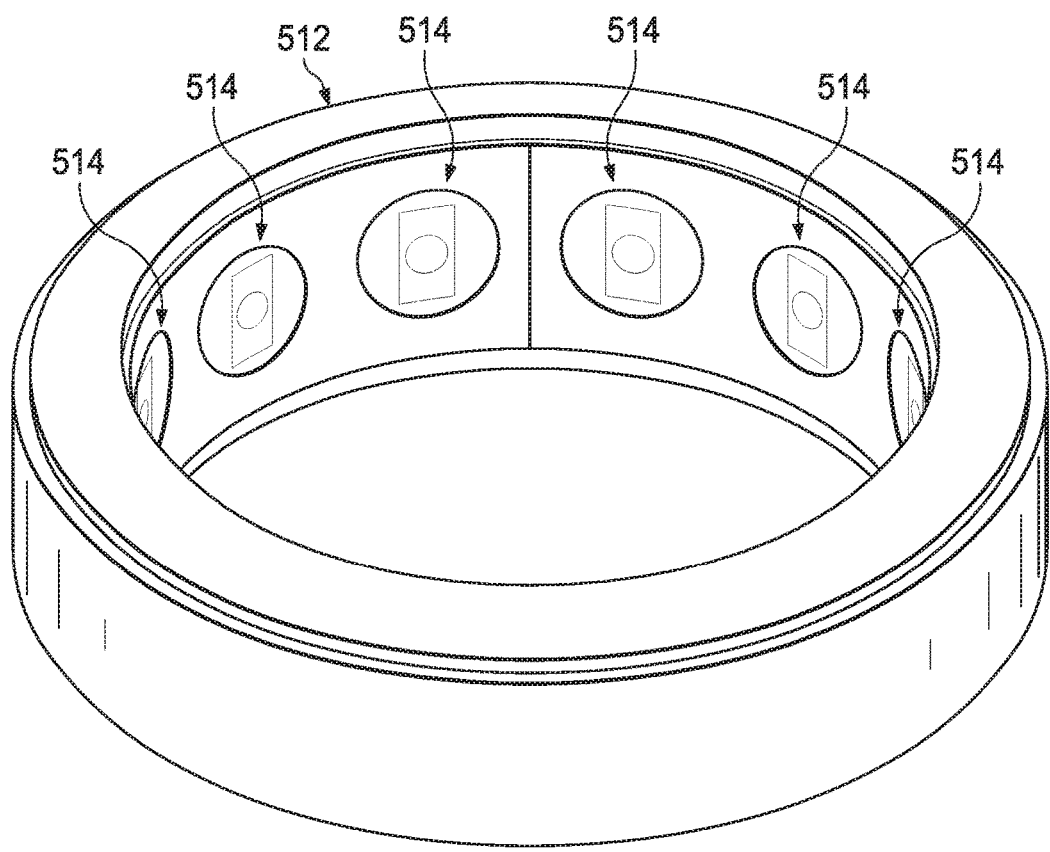
FIG. 5 illustrates an example of a smart ring including example haptic stimulators, in accordance with various embodiments.

FIG. 5 illustrates an example of a smart ring 512. The smart ring 512 may correspond to the smart ring 112 of FIG. 1, the smart ring 212a of FIG. 2A, the smart ring 212b of FIG. 2B, or the smart ring 412 of FIG. 4A. The smart ring 512 includes haptic stimulators 514. The haptic stimulators 514 may correspond to the haptic stimulators 114 of FIG. 1 or to the haptic stimulators 214a or 214b of FIG. 2A or 2B.

Figure 6:
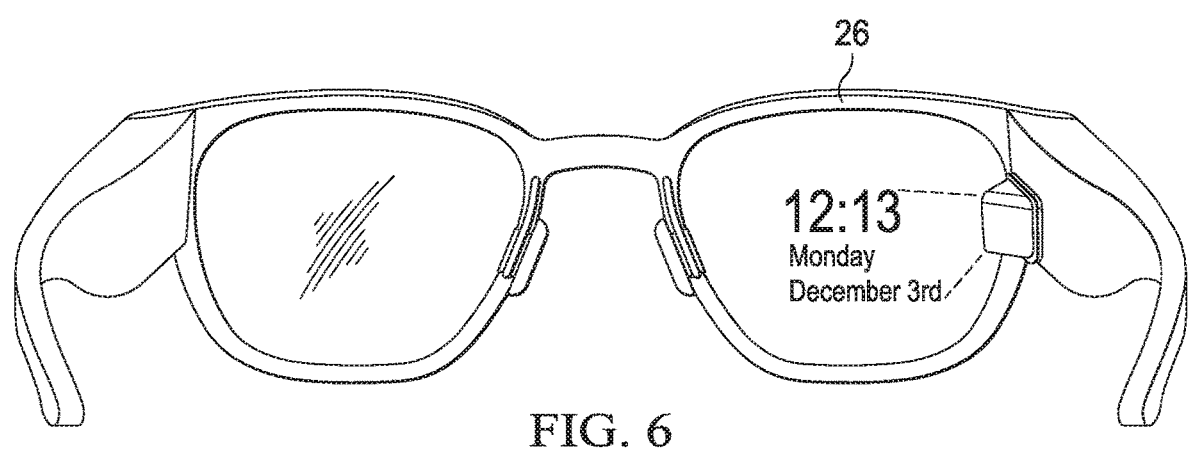
FIG. 6 illustrates an example visual device operable in connection with a smart ring to provide visual information, in accordance with various embodiments.

With reference to FIGS. 1 and 6, in various embodiments and as mentioned above with reference to FIG. 1, the sensory augmentation system 110 comprises one or more visual devices 26. In various embodiments, the one or more visual devices 26 may be configured to project images that correspond meaningfully to the haptic stimulation provided by the smart ring 112.

The visual device 26 may provide further functions. For instance, the visual device 26 may provide any visual input corresponding to the haptic input or complementary thereto. The visual device 26 may also provide unrelated input. For example, in various instances, the visual device 26 may provide for augmented reality experiences. The visual device 26 may provide for overlaid textures on a surrounding environment of a user. For example, the visual device 26 may provide for projection of images corresponding to textures that overlay perceived real world items. For instance, a smooth surface may, when looked upon by a user of visual device 26, be made by visual device 26 to appear rough. The visual device 26 may be configured to provide various visual augmented reality experiences to supplement or augment haptic stimulation provided by the smart ring 112 to further communicate related information to a user.

Figure 7:
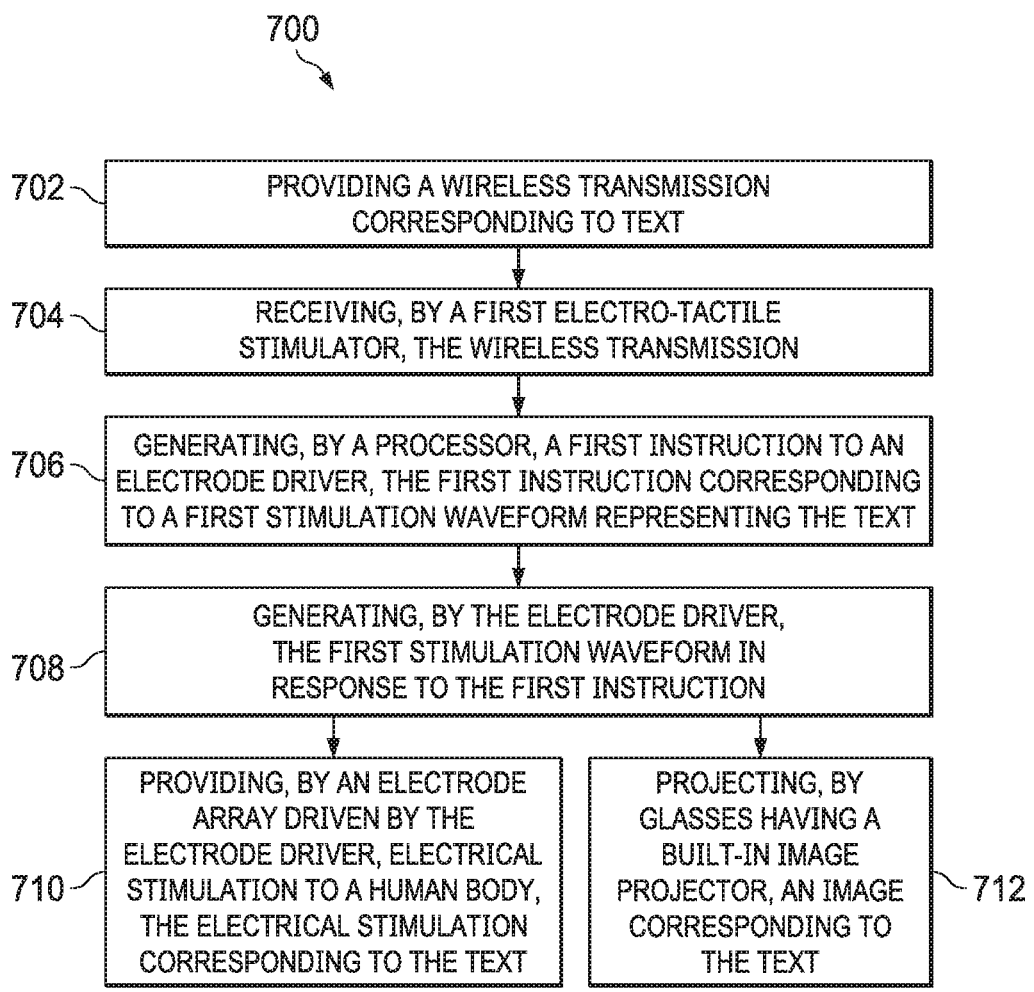
FIG. 7 illustrates a flowchart of an example method of sensory augmentation, in accordance with various embodiments.

Referencing FIG. 7, a method 700 of sensory augmentation is provided. The method may include providing, by a computing device, a wireless transmission corresponding to text (block 702). The method may include receiving by a first electro-haptic stimulator the wireless transmission (block 704). The method may further include generating, by a signal generation and sensing processor of the first electro-haptic stimulator, a first instruction to an electrode driver, the first instruction corresponding to a first stimulation waveform representing the text (block 706). The method may include generating, by the electrode driver the first stimulation waveform in response to the first instruction (block 708), and providing, by an electrode array driven by the electrode driver, electrical stimulation to a human body, the electrical stimulation corresponding to the text (block 710). In various embodiments, the method further includes projecting, by glasses having a built-in image projector, an image corresponding to the text (block 712).

Figure 8:
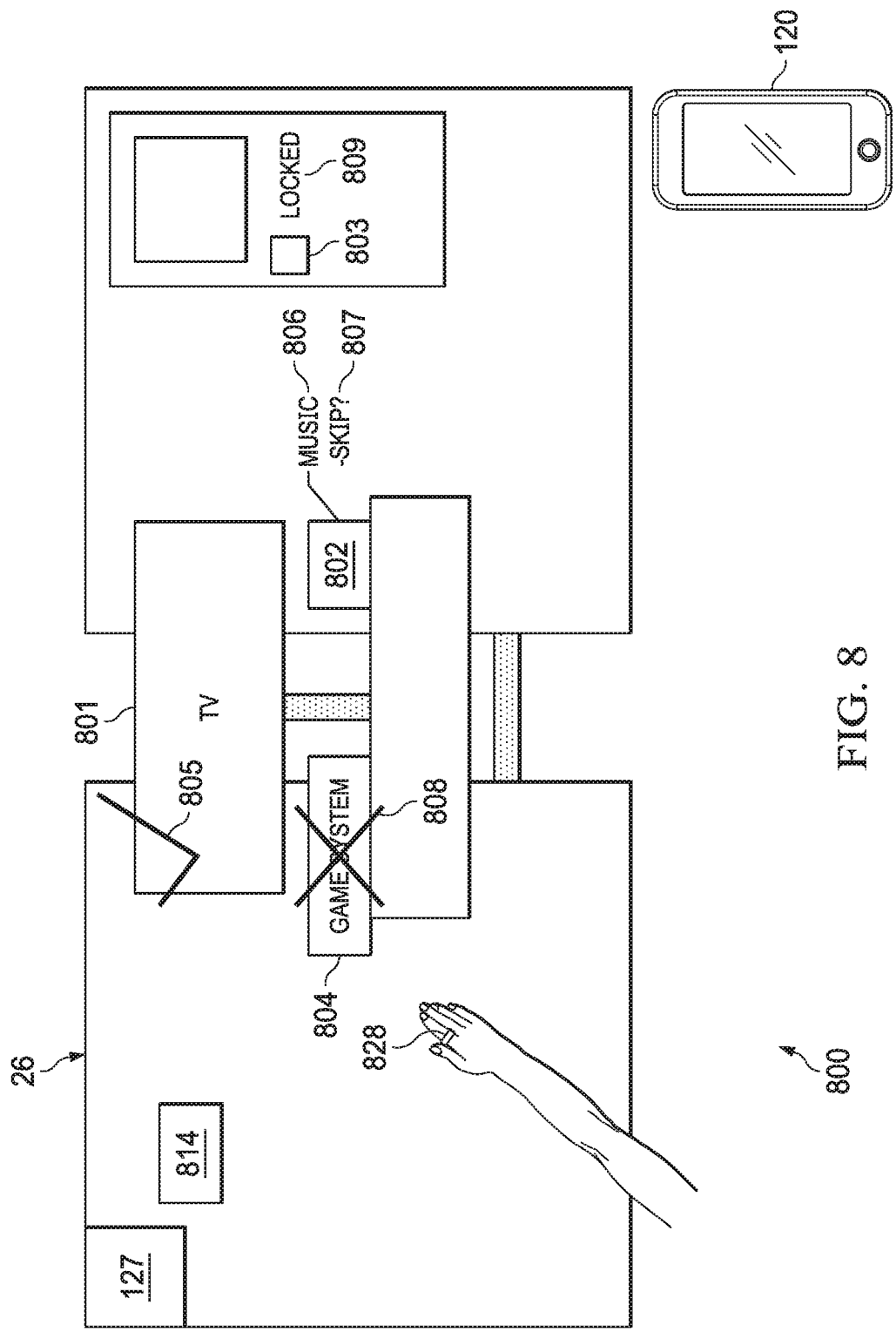
FIG. 8 illustrates a use scenario combining multiple aspects of the sensory augmentation platform of FIG. 1, in accordance with various embodiments.

Referencing FIG. 8, and with additional reference to FIGS. 1-7, a use scenario 800 using multiple aspects of the sensory augmentation platform 100 of FIG. 1 is shown. In various embodiments, the visual device 26 may further comprise a sensor 814. The sensor 814 may comprise any sensor configured to register at least one of an absolute or relative location of a smart ring 828. For example, the sensor 814 of the visual device 26 may comprise a camera configured to visually identify the location of the smart ring 828. The sensor 814 may comprise a depth or distance sensor, for instance, an ultrasonic sensor. The sensor 814 may comprise an electromagnetic sensor sensing non-human visible spectrum. The sensor 814 may comprise any sensor configured to determine spatial information with respect to a surrounding environment of a user. Moreover, such sensed information may be implemented to facilitate identification of an absolute or relative location of a user, a user's head, a user's hand, a user's smart ring 828, and other objects. In yet further instances, the visual device 26 does not include the sensor 814, and an inertial, gyroscopic, or other sensor included in the smart ring 828 provides such data, for instance, data representative of an absolute or relative location of the smart ring 828. In either event, the sensory augmentation platform 100 is capable of determining at least one of a relative or an absolute location of the smart ring 828. Moreover, in either event, the sensory augmentation platform 100 is capable of determining at least one of a relative or absolute location of objects in a surrounding environment of the user.

Additionally or alternatively, as described above with reference to the smart rings 212a and 212b of FIGS. 2A and 2B, the smart ring 828 may include one or more user sensors, such as the one or more user sensors 50a and 50b described above with reference to FIGS. 2A and 2B. In some of these examples, the position/optical sensor on the ring can determine or be used to determine ring position, gestures, and what the user is pointing at. For example, the optical sensor on the rings 212a and 212b of FIGS. 2A and 2B may be configured to measure light as described above, and transmit the one or more transmission signals 44a that include information indicating the measured light to a computing/wireless device (such as the augmentation control server 124 of FIG. 1). The augmentation control server 124 of FIG. 1 may be a spatially localized computing device that is configured to use the information indicating the measured light from each of the rings 212a and 212b of FIGS. 2A and 2B, other information (e.g., motion information from the motion sensors of the rings 212a and 212b), or both the information indicating the measured light and the other information, to determine spatial positions of the rings 212a and 212b using a triangulation algorithm. The augmentation control server 124 may determine, based on the determined spatial position of one or more of the rings 212a and 212b and a known labeled spatial datapoint corresponding to a device (e.g., a television), to determine whether one or more of the rings 212a and 212b are being pointed at the device (e.g., the television). When the augmentation control server 124 determines that one or more of the rings 212a and 212b is being pointed at the device (e.g., the television), the augmentation control server 124 may treat data (such as data corresponding to the one or more transmission signals 44a corresponding to the position and/or touch sensors 54a, 52a of FIG. 2A) corresponding to input (such as the input 62a of FIG. 2A) as control instructions to control the device (e.g., the television). When the augmentation control server 125 determines to treat the data as control instructions for the device (e.g., the television), the augmentation control server 124 processes the data to determine to what control instruction(s) the input 62a corresponds. For example, the input 62a may correspond to touch input at a particular location on the touch sensor 52a of the ring 52a, the augmentation control server 124 may receive the one or more transmission signals 44a that indicate the particular location, and the augmentation control server 124 may determine that the particular location corresponds to increasing a volume on the device (e.g., a television). The augmentation control server 124 may then send an instruction to the device (e.g., a television) to cause the television to increase the volume. Additionally or alternatively, the pointing information may be displayed on a device screen, thus the ring can act as a virtual pen and even turn a non-touchscreen device into a touchscreen device. Additionally or alternatively, as described above with reference to the smart rings 212a and 212b of FIGS. 2A and 2B, the smart ring 828 may be configured to detect swipes or other touch input and communicates the touch input to another device.

Consequently, the sensory augmentation platform 100 is able to ascertain hand movements by a user wearing the apparatus on a finger or otherwise ascertain the positioning by the user of the smart ring 828. Thus, the sensory augmentation platform 100 of FIG. 1 may be configured to determine that a user is pointing, gesturing, or otherwise, through movement of the smart ring 828, providing relevant information input. In various instances, a user may point a hand with a smart ring 828 at a device desired to be controlled or otherwise interacted with via the sensory augmentation platform 100. For example, a user may point at a television 801 to turn the television on or off, or may gesture up or down or left or right to control channel and/or volume of the television 801. Moreover, the user may point or otherwise gesture to control many devices, or to query for a status of the device. For example a user may point or otherwise gesture to control a game system 804, a smart home hub 802, an electronic lock 803 and/or the like. In various instances, the visual device 26 displays augmented reality data corresponding to a status of the television 801, game system 804, smart home hub 802, and/or electronic lock 803. In further instances, an application operating on a handheld computing device 120 depicts similar status information and/or permits control of the indicated devices. The visual device 26 may provide a television status indication 805 indicating that television 801 is on, and a game system indication 808 indicating that the game system 804 is off. Moreover, a lock status indication 809 may be depicted to allow ready determination of a locked or unlocked status of an electronic lock 803.

Furthermore, control aspects for devices may include both visual depictions via the visual device 26 and machine-human interactions by the smart ring 828. For example, the smart home hub 802 is shown playing music 806 and an option to skip a song is shown 807. A user may point, or otherwise interact with a point in space, such interaction detectable by the sensor 814 and/or by the smart ring 828, the point in space corresponding to a point in space overlaid by the projected text on the visual device 26 offering the option to skip 807. In response to a user pointing or touching such a point in space, the sensory augmentation system 100 may interoperate with the smart home hub 802, directing it to take a responsive action such as to skip a song being played, etc.

Thus, appreciating the teachings herein above and with reference to FIGS. 1-8 various use cases are possible. For instance, as mentioned, one or more sensor 814 on one or more visual device 26 facilitates generation of a three-dimensional model of that which a user is looking at. Moreover, the smart ring 828 may be communicatively coupled, directly or indirectly, to the visual device 26 or otherwise logically associated therewith. Consequently, a simulated reality may be modeled. The modeled simulated reality may comprise a three dimensional representation of a surrounding environment of a user and movements of a user and/or a user's smart ring 828 within the surrounding environment. In various embodiments, this modeled simulated reality may be electronically combined with further modeled simulated realities of further users of further smart ring 828 and/or visual devices 26.

Consequently, not only may a user interact with aspects of a surrounding environment via a visual device 26 and/or the smart ring 828, but a user may interact with aspects of a surrounding environment of a different user, via a visual device 26 and/or the smart ring 828. For instance, a visual device 26 may project images corresponding to a surrounding environment of a different user, or a simulated surrounding environment that is virtual in nature, thereby facilitating interaction with virtual realities. For instance, an architect and a customer may each wear a visual device 26 and one or smart ring 828. The architect may invite the customer to enter a simulated surrounding environment comprising an electronic model of a proposed building designed by the architect, or may invite the customer to interact with simulated items such as architectural plans and/or the like projected on the visual device 26.

A user may interact with a simulated environment or an environment of a different user via gestures or inputs measured by the smart ring 828 using the one or more user sensors 50a or 50b described above with reference to FIG. 2. Moreover, once such an environment is mapped by the visual device 26, a user may continue to interact with the environment via the smart ring 828 even without wearing the visual device 26. For instance, the smart ring 828 may include the one or more user sensors 50a or 50b, or may connect to one or more sensors of a handheld computing device 120 in order to determine its position within the environment. For instance, a user may point at a television 801 and turn the television on or off even without the visual device 26 to depict a status 805 of the television 801. Thus, one may appreciate that the smart ring 828 includes a wide variety of user sensors 50a or 50b of FIGS. 2A and 2B and the visual device 26 may include a wide variety of sensors 814. Sensors 814 may include accelerometers, gyroscopes, GPS, compasses, LIDAR, sonar, RADAR, and/or the like. Moreover, a separate illuminator device may be utilized to paint a constellation or pattern on an environment, including a pattern of light invisible to a human, which may be sensed by sensor 814 to ascertain spatial information regarding a location, such as a location of the smart ring 828 in an environment.

Thus, the sensory augmentation platform 100 may sense a user's surrounding environment, create a three-dimensional model of an environment, and permit interaction with the model via haptic stimulators, such as the haptic stimulators 114 of FIG. 1. The model may be shared with other users and may be projected onto other visual devices 26 so that other users may, utilizing their own smart ring 828, remotely interact with the model. Furthermore, a user may generate a unique user profile, so that the motion of the user and the user's smart ring 828 maybe specifically, accurately, and precisely tailored to the biology and personal attributes of the user. For instance, a user may move one's finger having a smart ring 828 through a full range of user arm motion to plot the extreme boundaries of potential motion. Such motion may be plotted relative to a location of a visual device 26 which may be worn on the user's head. In this manner, both the visual device 26 and the smart ring 828 may be calibrated for use by a specific user, and such calibration stored in a unique user profile.

While a computing device 120 has been discussed, as has an augmentation control server 124, in various instances, one or more additional computing devices 120 may be provided, called a local network node. The local network node may comprise a location specific processing module reposed within a specific physical site. In further instances, the local network node may be a logical instance running remotely within an augmentation control server 124 and accessible such as by a network. The local network node may be associated with a location, a user, an account and/or a combination thereof. In various embodiments, access to the local network node requires recurring subscription payments. In various instances, the three-dimensional model of the environment may be processed and/or stored in the local network node. In this manner, processor and memory included on the smart ring 828 and/or visual devices 26 may be ameliorated.

Moreover, the local network node may be implemented to facilitate additional features of a three-dimensional model of an environment. For instance, a user may create a home area, map the home area, assign locations to controllable devices in the home area, and automatically gain access to control the controllable devices upon entry into the home area. For instance, a local network node may be associated with a living room and may facilitate control of a television by pointing with the smart ring 828 in the direction of the television. Similarly, a local network node may facilitate control of a "virtual white board" whereby a user may draw in space on a blank wall of a room, or may load textures onto surfaces, the drawings and textures stored and at runtime, rendered, by the local network node.

In yet further use cases, a store may implement a local network node. A store may map products and store this mapping in a local network node, such as by walking about the room with a visual device 26 and/or with the smart ring 828. Subsequently, a customer may enter the store and make purchases by picking up an article, permitting the visual device 26 and/or the smart ring 828 to determine the selection of the object in connection with a local network node, and may facilitate purchasing of the item by an interaction with the smart ring 828. Thus, one may appreciate that a local network node may be locked to one or more user, or may permit connection by new users, such as customers, who enter a geographic region associated with the perimeter of a store.

Yet furthermore, a local network node may facilitate prompt alerting of police, fire, rescue services, and other resources as desired. For example, a local network node may facilitate calling the police in connection with detecting a pattern of user behavior by visual devices 26 or the smart ring 828 corresponding to a fall by a specific elderly user, but not when the fall corresponds to a user who is a gymnast. Alternatively, the local network node may facilitate calling the police in connection with detecting a pattern of user behavior by visual devices 26 and/or the smart ring 828 of any user corresponding to a fall and then a particular elapsed delay in arising from the fall, or in connection with pointing and/or gesturing by the user at a specific panic button or the like.

Yet furthermore, additional plug-in services may be implemented, whether on an as-needed basis, or a subscription basis. For instance, a user may activate a GPS mapping plug-in automatically upon connection to a local network node associated with an automobile, thereby facilitating provision of turn-by-turn instructions through haptic stimulation or visual indication upon entry into the vehicle, while not burdening the smart ring 828 or the visual device 26 with the memory and computational loads associated with GPS mapping when not in the vehicle.

Figure 9:
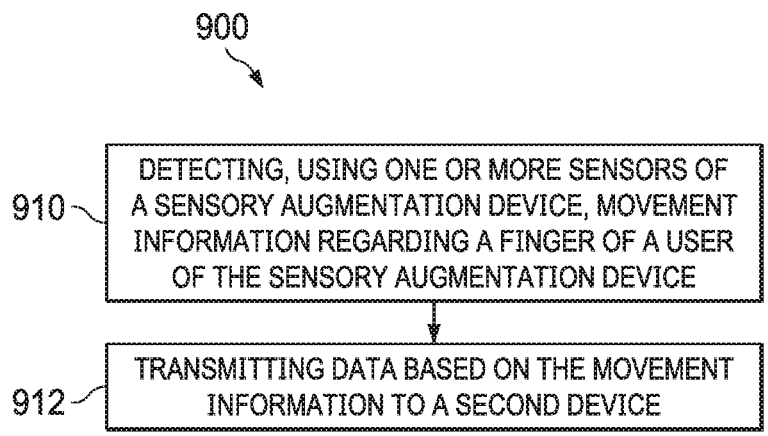
FIG. 9 illustrates a flowchart of an example method of sensory augmentation using one or more rings, such as one or more of the rings of FIG. 1, 2A, 2B, 4A-F, or 5.

FIG. 9 illustrates a method 900 implemented by the smart ring described herein. For example, the method 900 may be implemented using the smart ring 112 of FIG. 1, 212a or 212b of FIGS. 2A and 2B, 412a or 412b of FIG. 4A, or 512 of FIG. 5. The method 900 includes, at 910, detecting, using one or more sensors of the smart ring, movement information regarding a finger of a user of the apparatus. For example, the movement information may correspond to the information 62a of FIG. 2A, and the one or more user sensors may correspond to the position sensor 54a. The method 900 further includes, at 912, transmitting data based on the movement information to a second device. For example, the data may correspond to the one or more transmission signals 44a provided by the processor 218a and transmitted by the communications interface 227a. In some aspects of the method 900, the apparatus comprises a ring. In some aspects of the method 900, the one or more user sensors comprise a position sensor (such as the position sensor 54a of FIG. 2A), and the movement information corresponds to human readable message elements or to control instructions regarding the apparatus or another device as described above with reference to FIG. 2A.

Figure 10:
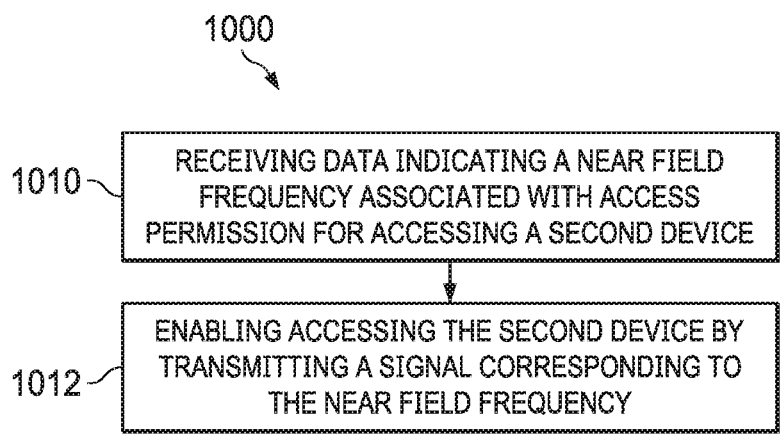
FIG. 10 illustrates a flowchart of an example method of sensory augmentation using one or more rings, such as one or more of the rings of FIG. 1, 2A, 2B, 4A-F, or 5.

FIG. 10 illustrates a method 1000 implemented by a smart ring described herein. For example, the method 1000 may be implemented using the smart ring 112 of FIG. 1, 212a or 212b of FIGS. 2A and 2B, 412a or 412b of FIG. 4A, or 512 of FIG. 5. The method 1000 includes, at 1010, receiving data indicating a near field frequency associated with access permission for accessing a second device. For example, the data may correspond to the data 72a of FIG. 2 and may be received by the network interface 227a of FIG. 2 as described above with reference to FIG. 2A. The method 1000 further includes, at 1012, enabling accessing the second device by transmitting a signal corresponding to the near field frequency. For example, the signal corresponding to the near field frequency may correspond to the signal 63a described above with reference to FIG. 2. In some aspects of the method 1000, the device comprises an automated lock or a vehicle, and accessing the device comprises unlocking the automated lock or starting the vehicle as described above with reference to FIG. 2A.

Figure 11:
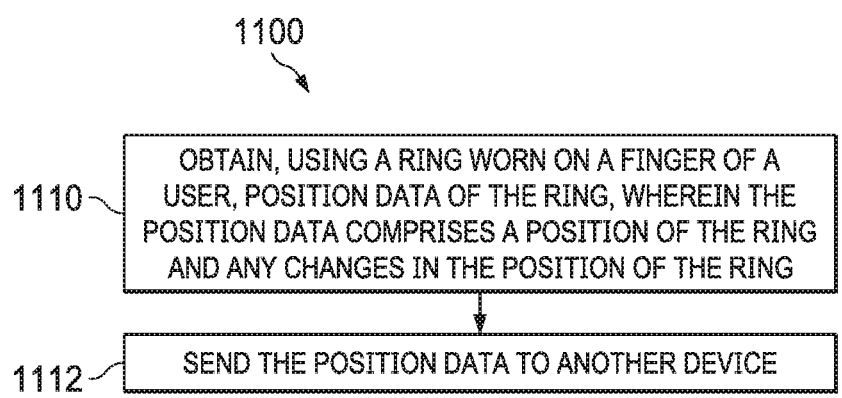
FIG. 11 illustrates a flowchart of an example method of sensory augmentation using one or more rings, such as one or more of the rings of FIG. 1, 2A, 2B, 4A-F, or 5.

FIG. 11 illustrates a method 1100 implemented by a smart ring described herein. For example, the method 1100 may be implemented using the smart ring 112 of FIG. 1, 212a or 212b of FIGS. 2A and 2B, 412a or 412b of FIG. 4A, or 512 of FIG. 5. The method 1100 includes, at 1110, obtaining, using a ring worn on a finger of a user, position data of the ring, wherein the position data comprises a position of the ring and any changes in the position of the ring. The method 1100 further includes, at 1112, sending the position data to another device. In some aspects of the method 1100, the position data identifies a movement by a hand of the user, and the position data sent to the other device directs an action on the other device. In some aspects of the method 1100, the movement is pointing, and the ring comprises an optical sensor oriented outward from the ring towards an end of the finger. In some of these examples, the optical sensor is configured to detect an item to which the user is pointing, and the method 1100 further includes sending an indication of the item to the other device. In some aspects of the method 1100, the movement is swiping, and the ring comprises an optical sensor oriented outward from the ring towards an end of the finger. In some examples, the optical sensor is configured to detect an item to which the user is swiping, and the method 1100 further includes sending an indication of the item to the other device.

Having discussed aspects of a system and method provided herein, general features relevant to electronic communication are further outlined below. As used herein, the term "network," such as with respect to a network which may comprise at least a portion of the network 122 illustrated in FIG. 1, includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with transmission control protocol/Internet protocol (TCP/IP) communications protocols, the system may also be implemented using Internetwork Packet Exchange (IPX), Appletalk, IP-6, Network Basic Input/Output System (NetBIOS), Open Systems Interconnection (OSI), any tunneling protocol (e.g. Internet Protocol Security (IPsec), Secure Shell (SSH)), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

A network may be unsecure. Thus, communication over the network may utilize data encryption. Encryption may be performed by way of any of the techniques now available in the art or which may become available—e.g., Twofish, Rivest-Shamir-Adleman (RSA), El Gamal, Schorr signature, digital signature algorithm (DSA), Pretty Good Privacy (PGP), Public Key Infrastructure (PKI), GNU Privacy Guard (GPG or GnuPG), and symmetric and asymmetric crypto systems.

Any communication, transmission and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website or device (e.g., Facebook, YouTube®, AppleTV®, Pandora®, xBox®, Sony® Playstation®), a uniform resource locator ("URL"), a document (e.g., a Microsoft Word® document, a Microsoft Excel® document, an Adobe .pdf document, etc.), an "ebook," an "emagazine," an application or microapplication (as described herein), an SMS or other type of text message, an email, Facebook, twitter, Multimedia Messaging Service (MMS) and/or other type of communication technology. In various embodiments, a channel may be hosted or provided by a data partner. In various embodiments, the distribution channel may comprise at least one of a merchant web site, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include Facebook®, Foursquare®, Twitter®, MySpace®, LinkedIn®, and the like. Examples of affiliate or partner websites include American Express®, Visa®, Google®, and the like. Moreover, examples of mobile device communications include texting, email, and mobile applications for smartphones.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; utility company data; institution data; regulatory agency data; and/or like data useful in the operation of the system. As those skilled in the art will appreciate, user computer may include an operating system (e.g., Windows NT®, Windows 95/98/2000®, Windows XP®, Windows Vista®, Windows 7®, OS2, UNIX®, Linux®, Solaris®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as determining or selecting, which are commonly associated with mental operations performed by a human operator. No such capability of a human operator is necessary, possible, or desirable in most cases, in any of the operations described herein. Rather, the operations may be machine operations not performable by mere human activity.

In fact, in various embodiments, the embodiments are directed toward one or more computer systems capable of carrying out the functionality described herein. The computer system includes one or more processors. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. The computer system can include a display interface that forwards graphics, text, and other data from the communication infrastructure (or from a frame buffer not shown) for display on a display unit.

The computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. The removable storage unit represents a floppy disk, magnetic tape, optical disk, etc., which is read by and written to by the removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

The computer system may also include a communications interface. The communications interface allows software and data to be transferred between the computer system and external devices. Examples of the communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, and optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in the hard disk drive. These computer program products provide software to the computer system.

Computer programs (also referred to as computer control logic) are stored in the main memory and/or secondary memory. Computer programs may also be received via the communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into the computer system using a removable storage drive, hard disk drive or communications interface. The control logic (software), when executed by the processor, causes the processor to perform the functions of various embodiments as described herein. In various embodiments, hardware components such as application specific integrated circuits (ASICs) are implemented. Implementation of the hardware state machine, so as to perform the functions described herein will be apparent to persons skilled in the relevant art(s).

The various system components may be independently, separately or collectively suitably coupled to the network via data links which includes, for example, a connection to an Internet Service Provider (ISP) over the local loop as is typically used in connection with standard modem communication, cable modem, Dish Networks®, Integrated Services Digital Network (ISDN), Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://nvlpubs.nist.gov/nistpubs/Legacy/SP/nistspecialpublication800-145.pdf (last visited August 2019), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

The computers discussed herein may provide a suitable website or other internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard Hypertext Markup Language (HTML) documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL (http://yahoo.com/stockquotes/ge) and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, Simple Object Access Protocol (SOAP), AJAX, Web Services Description Language (WSDL) and Universal Description, Discovery, and Integration (UDDI). Web services methods are well known in the art, and are covered in many standard texts. See, e.g., ALEX NGHIEM, IT WEB SERVICES: A ROADMAP FOR THE ENTERPRISE (2003), hereby incorporated by reference.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U. S. C. § 101.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc., are not intended to limit the order of the steps; these words are simply used to guide the reader through the description of the methods. Although process flow diagrams may describe the operations as a sequential process, many of the operations can be performed in parallel or concurrently. In addition, the order of the operations may be rearranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or the like, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor executable software module which may reside on a computer-readable or processor-readable storage medium. A non-transitory computer-readable or processor-readable media includes both computer storage media and tangible storage media that facilitate transfer of a computer program from one place to another. A non-transitory, processor-readable storage media may be any available media that may be accessed by a computer. By way of example, and not limitation, such non-transitory, processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory, processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A smart ring, comprising:
   a ring body configured to be worn on a finger of a user;
   a plurality of haptic stimulators coupled to the ring body, wherein the haptic stimulators are configured to create pressure on or transfer an electrical impulse to a skin of the user;
   a communications interface coupled to the ring body and configured to receive data; and
   a processor coupled to the haptic stimulators and the communications interface, wherein the processor is configured to provide a drive signal to the haptic stimulators based on the data;
   wherein the haptic stimulators are configured to receive the drive signal from the processor and communicate the data to the user via a haptic stimulation, and
   wherein the drive signal is configured to individually actuate each of the haptic stimulators in a series of unique combinations, each unique combination representing vertices of a geometric representation of a letter in an alphabet.

2. The smart ring of claim 1, wherein the communications interface receives the data wirelessly from a wireless device or an augmentation control server.

3. The smart ring of claim 1, further comprising a touch sensor coupled to the ring body and configured to receive input from the user, and wherein the communications interface is further configured to transmit the input wirelessly to a wireless device or a hub.

4. The smart ring of claim 1, further comprising an optical sensor coupled to the processor and oriented outward from the ring such that the optical sensor is oriented towards an end of the finger when the ring is worn by the user, wherein the optical sensor is configured to detect an item to which the user is pointing, and wherein the processor is further configured to send an indication of the item to another device.

5. A smart ring, comprising:
   a ring body configured to be worn on a finger of a user;
   a capacitive touch sensor coupled to the ring body;
   a plurality of haptic stimulators coupled to the ring body;
   a processor coupled to the capacitive touch sensor and the haptic stimulators; and
   a communications interface coupled to the processor, wherein the haptic stimulators are arranged linearly around an interior surface of the ring body and are configured to individually create pressure on or transfer an electrical impulse to a skin of the user in a series of unique combinations, at least some of which represent vertices of a geometric representation of a letter in an alphabet.

6. The smart ring of claim 5, wherein:
the capacitive touch sensor is configured to receive a touch input from the user and convert the touch input into an input signal.

7. The smart ring of claim 6, wherein the processor is configured to:
receive the input signal from the capacitive touch sensor and generate a transmission signal using the input signal; and
provide drive signals to the haptic stimulators based on the transmission signal.

8. The smart ring of claim 5, further comprising an optical sensor coupled to the processor and oriented outward from the ring such that the optical sensor is oriented towards an end of the finger when the ring is worn by the user, wherein the optical sensor is configured to detect an item to which the user is pointing, and wherein the processor is further configured to send an indication of the item to another device.

9. The smart ring of claim 5, further comprising a position sensor coupled to the ring body, wherein the position sensor is configured to obtain position data and send the position data to the processor, wherein the processor is configured to generate a second transmission signal using the position data, and wherein the communications interface is configured to transmit the second transmission signal to another device.

10. The smart ring of claim 5, further comprising a memory coupled to the processor and comprising an access identifier (ID), wherein the communications interface comprises a near field communications (NFC) interface that is configured to communicate the access ID to a security reader external to the ring.

11. The smart ring of claim 5, wherein the haptic stimulators are configured to receive a drive signal from the processor and communicate the data to the user via a haptic stimulation.

12. The smart ring of claim 11, wherein the haptic stimulators are spaced around an interior surface of the ring body, wherein the drive signal is configured to individually actuate each of the haptic stimulators in the series of unique combinations.

13. A method of operating a smart ring, comprising:
obtaining, using a smart ring worn on a finger of a user, input via a capacitive sensor of the smart ring and position data of the smart ring, wherein the position data comprises a position of the smart ring and any changes in the position of the ring; and
sending the position data to another device based on the input received via the capacitive sensor.

14. The method of claim 13, further comprising creating pressure on or transferring an electrical impulse to a skin of the user via a haptic stimulator.

15. The method of claim 13, wherein the position data identifies a movement by a hand of the user, and wherein the position data sent to the another device directs an action on the another device.

16. The method of claim 13, further comprising:
receiving data wirelessly from a wireless device or an augmentation control server; and
creating pressure on or transferring an electrical impulse to a skin of the user via a haptic stimulator responsive to the received data.

17. The method of claim 13, further comprising:
receiving second input via the capacitive sensor of the smart ring responsive to creation of pressure on skin of the user; and
responsive to receipt of the second input, transmitting data to the another device.

18. The method of claim 17, further comprising:
detecting, via an optical sensor, an item to which the user is pointing; and
designating the item to which the user is pointing as the another device.

19. The method of claim 17, further comprising:
detecting, via an optical sensor, an item to which the user is pointing; and
transmitting an indication of the item to the another device.

* * * * *